(12) United States Patent
Eiyama

(10) Patent No.: US 11,639,068 B2
(45) Date of Patent: May 2, 2023

(54) INFORMATION PROCESSING APPARATUS, RECORDING APPARATUS, INFORMATION PROCESSING METHOD, AND STORAGE MEDIUM

(71) Applicant: CANON KABUSHIKI KAISHA, Tokyo (JP)

(72) Inventor: Masato Eiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 17/375,964

(22) Filed: Jul. 14, 2021

(65) Prior Publication Data
US 2022/0024225 A1    Jan. 27, 2022

(30) Foreign Application Priority Data
Jul. 21, 2020    (JP) .............................. JP2020-124526

(51) Int. Cl.
*B41J 29/393* (2006.01)
*B41J 11/00* (2006.01)
*B41J 29/46* (2006.01)
*B41J 11/48* (2006.01)

(52) U.S. Cl.
CPC ............ *B41J 11/009* (2013.01); *B41J 11/485* (2013.01); *B41J 29/393* (2013.01); *B41J 29/46* (2013.01); *B41J 2203/01* (2020.08)

(58) Field of Classification Search
CPC ..... B41J 11/009; B41J 29/393; G06F 3/1204; G06F 3/1205; G06F 3/1219
See application file for complete search history.

(56) References Cited

U.S. PATENT DOCUMENTS

| | | | |
|---|---|---|---|
| 2020/0276835 A1* | 9/2020 | Kasamatsu | .......... B41J 11/0095 |
| 2020/0314276 A1* | 10/2020 | Igarashi | ................ G06F 3/1204 |
| 2022/0159140 A1* | 5/2022 | Yamamoto | .......... H04N 1/00724 |
| 2022/0194099 A1* | 6/2022 | Kamada | ................ G06N 3/0454 |

FOREIGN PATENT DOCUMENTS

JP    2016215591 A    12/2016

* cited by examiner

*Primary Examiner* — Julian D Huffman
(74) *Attorney, Agent, or Firm* — Canon U.S.A., Inc. I.P. Division

(57) ABSTRACT

An information processing apparatus includes a type reception unit, a notification unit, a mode reception unit, and a determination unit. The mode reception unit receives a mode selected from among a plurality of modes for determining a determined type of recording medium for use in a recording apparatus, wherein the information processing apparatus is configured to perform operations including determining, in a designation mode, a selected type of recording medium indicated by information received by the type reception unit, and determining, in an automatic determination mode, an automatically determined type of recording medium for use in the recording apparatus without receiving input user information indicating the recording medium type. In response to the determination unit determining that the mode is able to be changed from the designation mode to the automatic determination mode, the notification unit issues a prompting notification to prompt a user to change the mode.

24 Claims, 28 Drawing Sheets

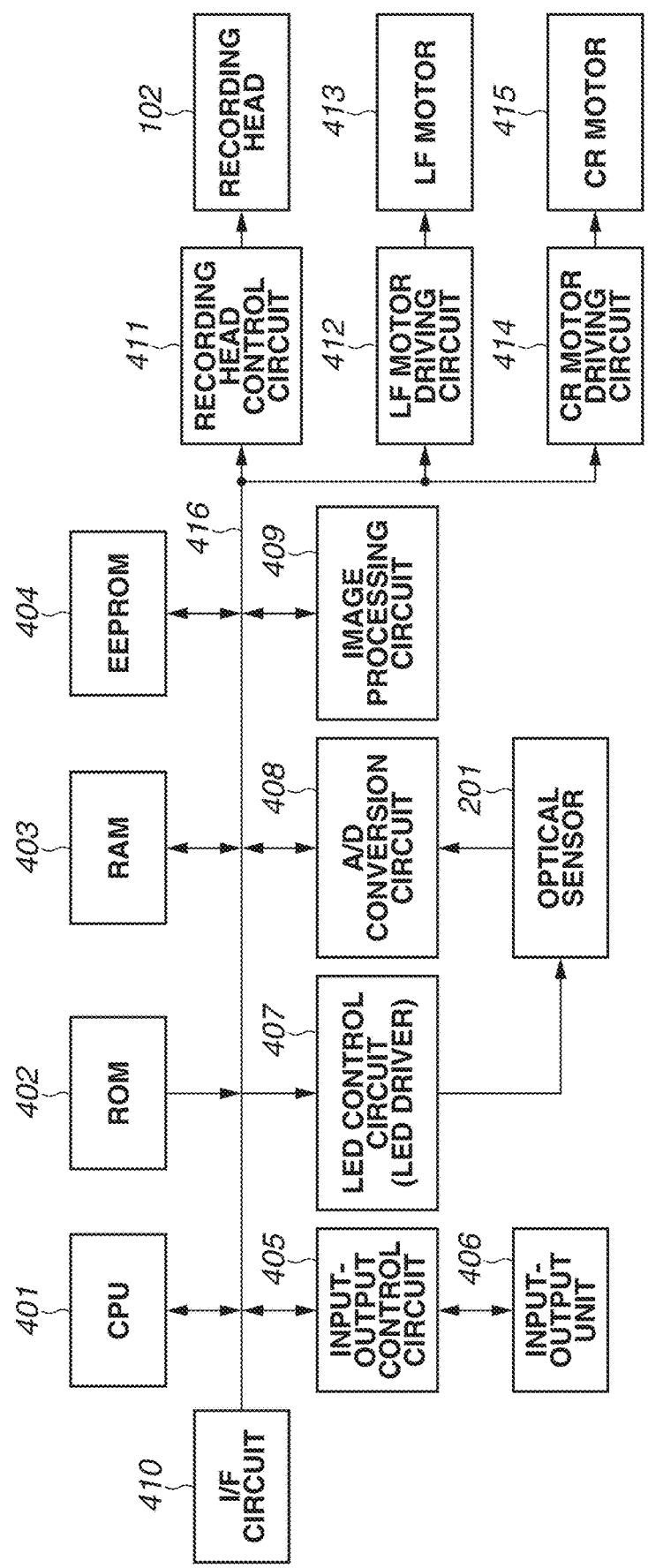

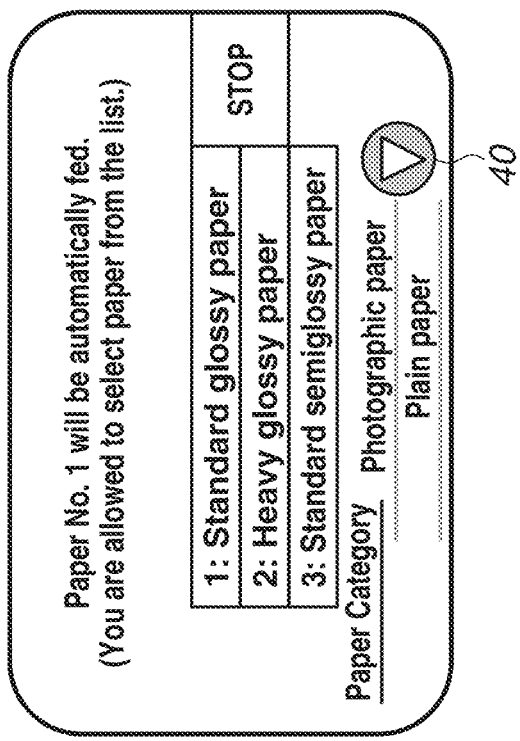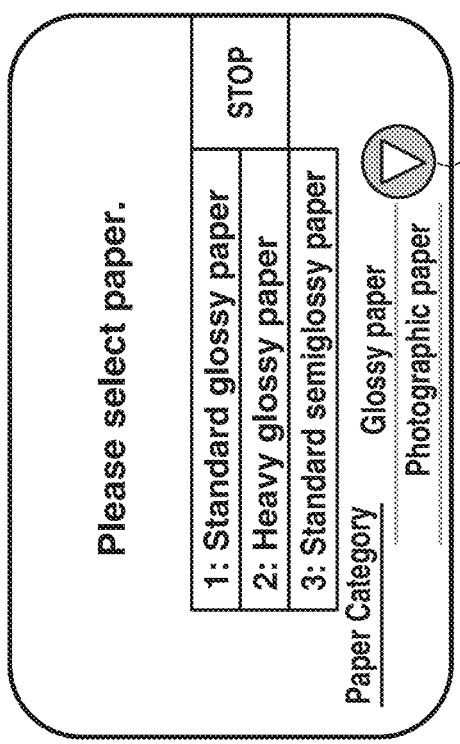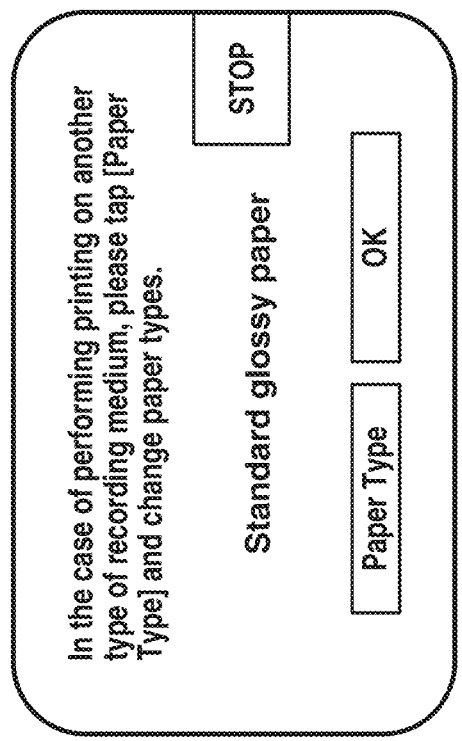

FIG.11A

|  |  | STANDARD GLOSSY PAPER | STANDARD SEMIGLOSSY PAPER | PREMIUM GLOSSY PAPER | HEAVY GLOSSY PAPER | STANDARD PLAIN PAPER | PREMIUM PLAIN PAPER |
|---|---|---|---|---|---|---|---|
| SPECULAR REFLECTION VALUE | minimum | 95 | 94 | 100 | 95 | 85 | 90 |
|  | middle | 100 | 99 | 105 | 100 | 90 | 95 |
|  | maximum | 105 | 104 | 110 | 105 | 95 | 100 |
| DIFFUSE REFLECTION VALUE | minimum | 95 | 90 | 110 | 95 | 70 | 78 |
|  | middle | 100 | 95 | 115 | 100 | 75 | 83 |
|  | maximum | 105 | 100 | 120 | 105 | 80 | 88 |
| PAPER THICKNESS | minimum | 140 | 140 | 160 | 220 | 45 | 60 |
|  | middle | 190 | 190 | 210 | 270 | 95 | 110 |
|  | maximum | 240 | 240 | 260 | 320 | 146 | 160 |

FIG.11B

|  |  | STANDARD GLOSSY PAPER | STANDARD SEMIGLOSSY PAPER | PREMIUM GLOSSY PAPER | HEAVY GLOSSY PAPER | STANDARD PLAIN PAPER | PREMIUM PLAIN PAPER |
|---|---|---|---|---|---|---|---|
| SPECULAR REFLECTION VALUE | minimum | 95 | 95 | 100 | 95 | 85 | 90 |
|  | middle | 100 | 100 | 105 | 100 | 90 | 95 |
|  | maximum | 105 | 105 | 110 | 105 | 95 | 100 |
| DIFFUSE REFLECTION VALUE | minimum | 95 | 91 | 110 | 95 | 70 | 78 |
|  | middle | 100 | 96 | 115 | 100 | 75 | 83 |
|  | maximum | 105 | 101 | 120 | 105 | 80 | 88 |
| PAPER THICKNESS | minimum | 140 | 149 | 160 | 220 | 45 | 60 |
|  | middle | 190 | 199 | 210 | 270 | 95 | 110 |
|  | maximum | 240 | 249 | 260 | 320 | 146 | 160 |

FIG.14

| SPECULAR REFLECTION VALUE | 103 |
|---|---|
| DIFFUSE REFLECTION VALUE | 98 |
| PAPER THICKNESS | 225 |

FIG.15

| | STANDARD GLOSSY PAPER | STANDARD SEMIGLOSSY PAPER | PREMIUM GLOSSY PAPER | HEAVY GLOSSY PAPER | STANDARD PLAIN PAPER | PREMIUM PLAIN PAPER |
|---|---|---|---|---|---|---|
| PAPER THICKNESS | Yes | Yes | Yes | Yes | No | No |
| DIFFUSE REFLECTION VALUE | Yes | Yes | No | Yes | Do not perform determination | Do not perform determination |
| SPECULAR REFLECTION VALUE | Yes | Yes | Do not perform determination | Yes | Do not perform determination | Do not perform determination |

FIG.16A

| | STANDARD GLOSSY PAPER | STANDARD SEMIGLOSSY PAPER | PREMIUM GLOSSY PAPER | HEAVY GLOSSY PAPER | STANDARD PLAIN PAPER | PREMIUM PLAIN PAPER |
|---|---|---|---|---|---|---|
| SPECULAR REFLECTION VALUE | 0.6 | 0.8 | Non-applicable | 0.6 | Non-applicable | Non-applicable |
| DIFFUSE REFLECTION VALUE | 0.4 | 0.6 | Non-applicable | 0.4 | Non-applicable | Non-applicable |
| PAPER THICKNESS | 0.7 | 0.7 | Non-applicable | 0.9 | Non-applicable | Non-applicable |
| TOTAL | 1.7 | 2.1 | | 1.9 | | |
| ORDER | 1 | 3 | | 2 | | |

FIG.16B

| | STANDARD GLOSSY PAPER | STANDARD SEMIGLOSSY PAPER | PREMIUM GLOSSY PAPER | HEAVY GLOSSY PAPER | STANDARD PLAIN PAPER | PREMIUM PLAIN PAPER |
|---|---|---|---|---|---|---|
| SPECULAR REFLECTION VALUE | 0.6 | 0.4 | Non-applicable | 0.6 | Non-applicable | Non-applicable |
| DIFFUSE REFLECTION VALUE | 0.4 | 0.6 | Non-applicable | 0.4 | Non-applicable | Non-applicable |
| PAPER THICKNESS | 0.7 | 0.52 | Non-applicable | 0.9 | Non-applicable | Non-applicable |
| TOTAL | 1.7 | 1.52 | | 1.9 | | |
| ORDER | 2 | 1 | | 3 | | |

FIG.17A

| | | STANDARD SEMIGLOSSY PAPER |
|---|---|---|
| SPECULAR REFLECTION VALUE | Measured value obtained one time before | 99 |
| | Measured value obtained two times before | 99 |
| | Measured value obtained three times before | 99 |
| | Characteristic value (Average value) | 99 |

FIG.17B

| | | STANDARD SEMIGLOSSY PAPER |
|---|---|---|
| SPECULAR REFLECTION VALUE | Measured value obtained one time before | 103 |
| | Measured value obtained two times before | 99 |
| | Measured value obtained three times before | 99 |
| | Characteristic value (Average value) | 100.3 |

FIG.17C

| | | STANDARD SEMIGLOSSY PAPER |
|---|---|---|
| SPECULAR REFLECTION VALUE | Measured value obtained one time before | 104 |
| | Measured value obtained two times before | 103 |
| | Measured value obtained three times before | 99 |
| | Characteristic value (Average value) | 102 |

FIG.17D

| | | STANDARD SEMIGLOSSY PAPER |
|---|---|---|
| SPECULAR REFLECTION VALUE | Measured value obtained one time before | 102 |
| | Measured value obtained two times before | 104 |
| | Measured value obtained three times before | 103 |
| | Characteristic value (Average value) | 103 |

FIG.23A

| STANDARD GLOSSY PAPER | SPECULAR REFLECTION | DIFFUSE REFLECTION | PAPER THICKNESS |
|---|---|---|---|
| n = 1 | 96 | 98 | 183 |
| n = 2 | 97 | 102 | 185 |
| n = 3 | 95 | 96 | 188 |
| n = 4 | 96 | 98 | 190 |
| n = 5 | 99 | 101 | 180 |
| n = 6 | 102 | 95 | 182 |
| AVERAGE VALUE | 97.5 | 98.3 | 184.7 |
| 3σ | 7.8 | 8.2 | 11.3 |
| ESTIMATION RANGE UPPER LIMIT | 93.6 | 94.2 | 179.0 |
| ESTIMATION RANGE LOWER LIMIT | 101.4 | 102.4 | 190.3 |

| STANDARD PLAIN PAPER | SPECULAR REFLECTION | DIFFUSE REFLECTION | PAPER THICKNESS |
|---|---|---|---|
| n = 1 | 86 | 73 | 80 |
| n = 2 | 92 | 77 | 87 |
| n = 3 | 95 | 80 | 83 |
| n = 4 | 87 | 76 | 95 |
| n = 5 | 90 | 68 | 97 |
| n = 6 | 90 | 75 | 96 |
| AVERAGE VALUE | 90.0 | 76.5 | 89.7 |
| 3σ | 9.9 | 7.3 | 21.9 |
| ESTIMATION RANGE UPPER LIMIT | 85.1 | 72.9 | 78.7 |
| ESTIMATION RANGE LOWER LIMIT | 94.9 | 80.1 | 100.6 |

| HEAVY GLOSSY PAPER | SPECULAR REFLECTION | DIFFUSE REFLECTION | PAPER THICKNESS |
|---|---|---|---|
| n = 1 | 96 | 98 | 265 |
| n = 2 | — | — | — |
| n = 3 | — | — | — |
| n = 4 | — | — | — |
| n = 5 | — | — | — |
| n = 6 | — | — | — |
| AVERAGE VALUE | — | — | — |
| 3σ | — | — | — |
| ESTIMATION RANGE UPPER LIMIT | 91 | 93 | 215 |
| ESTIMATION RANGE LOWER LIMIT | 101 | 103 | 315 |

| PREMIUM GLOSSY PAPER | SPECULAR REFLECTION | DIFFUSE REFLECTION | PAPER THICKNESS |
|---|---|---|---|
| n = 1 | 101 | 114 | 204 |
| n = 2 | 103 | 115 | 209 |
| n = 3 | 100 | 115 | 206 |
| n = 4 | — | — | — |
| n = 5 | — | — | — |
| n = 6 | — | — | — |
| AVERAGE VALUE | 101.3 | 114.7 | 206.3 |
| 3σ | 4.6 | 1.7 | 7.5 |
| ESTIMATION RANGE UPPER LIMIT | 99.0 | 113.8 | 202.5 |
| ESTIMATION RANGE LOWER LIMIT | 103.6 | 115.5 | 210.1 |

FIG.23B

| STANDARD SEMIGLOSSY PAPER | SPECULAR REFLECTION | DIFFUSE REFLECTION | PAPER THICKNESS | PREMIUM PLAIN PAPER | SPECULAR REFLECTION | DIFFUSE REFLECTION | PAPER THICKNESS |
|---|---|---|---|---|---|---|---|
| n = 1 | — | — | — | n = 1 | — | — | — |
| n = 2 | — | — | — | n = 2 | — | — | — |
| ... | ... | ... | ... | ... | ... | ... | ... |
| n = N | — | — | — | n = N | — | — | — |
| AVERAGE VALUE | — | — | — | AVERAGE VALUE | — | — | — |
| 3σ | — | — | — | 3σ | — | — | — |
| ESTIMATION RANGE UPPER LIMIT | — | — | — | ESTIMATION RANGE UPPER LIMIT | — | — | — |
| ESTIMATION RANGE LOWER LIMIT | — | — | — | ESTIMATION RANGE LOWER LIMIT | — | — | — |

FIG.24

| SPECULAR REFLECTION | STANDARD GLOSSY PAPER | STANDARD PLAIN PAPER | HEAVY GLOSSY PAPER | PREMIUM GLOSSY PAPER | STANDARD SEMIGLOSSY PAPER | PREMIUM PLAIN PAPER |
|---|---|---|---|---|---|---|
| STANDARD GLOSSY PAPER | | 0 | 0 | 0 | — | — |
| STANDARD PLAIN PAPER | | | 0 | 1 | — | — |
| HEAVY GLOSSY PAPER | | | | 0 | — | — |
| PREMIUM GLOSSY PAPER | | | | | — | — |
| STANDARD SEMIGLOSSY PAPER | | | | | | — |
| PREMIUM PLAIN PAPER | | | | | | |

| DIFFUSE REFLECTION | STANDARD GLOSSY PAPER | STANDARD PLAIN PAPER | HEAVY GLOSSY PAPER | PREMIUM GLOSSY PAPER | STANDARD SEMIGLOSSY PAPER | PREMIUM PLAIN PAPER |
|---|---|---|---|---|---|---|
| STANDARD GLOSSY PAPER | | 1 | 0 | 1 | — | — |
| STANDARD PLAIN PAPER | | | 1 | 1 | — | — |
| HEAVY GLOSSY PAPER | | | | 1 | — | — |
| PREMIUM GLOSSY PAPER | | | | | — | — |
| STANDARD SEMIGLOSSY PAPER | | | | | | — |
| PREMIUM PLAIN PAPER | | | | | | |

| PAPER THICKNESS | STANDARD GLOSSY PAPER | STANDARD PLAIN PAPER | HEAVY GLOSSY PAPER | PREMIUM GLOSSY PAPER | STANDARD SEMIGLOSSY PAPER | PREMIUM PLAIN PAPER |
|---|---|---|---|---|---|---|
| STANDARD GLOSSY PAPER | | 1 | 1 | 1 | — | — |
| STANDARD PLAIN PAPER | | | 1 | 1 | — | — |
| HEAVY GLOSSY PAPER | | | | 1 | — | — |
| PREMIUM GLOSSY PAPER | | | | | — | — |
| STANDARD SEMIGLOSSY PAPER | | | | | | — |
| PREMIUM PLAIN PAPER | | | | | | |

FIG.25

| "OR" RESULT OF ALL DETERMINATION RESULTS | STANDARD GLOSSY PAPER | STANDARD PLAIN PAPER | HEAVY GLOSSY PAPER | PREMIUM GLOSSY PAPER | STANDARD SEMIGLOSSY PAPER | PREMIUM PLAIN PAPER |
|---|---|---|---|---|---|---|
| STANDARD GLOSSY PAPER | | 1 | 1 | 1 | — | — |
| STANDARD PLAIN PAPER | | | 1 | 1 | — | — |
| HEAVY GLOSSY PAPER | | | | 1 | — | — |
| PREMIUM GLOSSY PAPER | | | | | — | — |
| STANDARD SEMIGLOSSY PAPER | | | | | | — |
| PREMIUM PLAIN PAPER | | | | | | |

FIG.26A

You are recommended to change the paper selection method to "estimation automatic mode".

[Perform mode change] [Do not perform mode change]

FIG.26B

You are recommended to change the paper selection method to "fixed mode".
Fixed paper type: "Standard glossy"

[Perform mode change] [Do not perform mode change]

INFORMATION PROCESSING APPARATUS, RECORDING APPARATUS, INFORMATION PROCESSING METHOD, AND STORAGE MEDIUM

BACKGROUND

Field

Aspects of the present disclosure generally relate to an information processing apparatus, a recording apparatus, an information processing method, and a storage medium.

Description of the Related Art

In performing recording in a recording apparatus, performing recording using control parameters corresponding to types of recording media is known.

As a method of selecting a type of recording medium, a method of allowing the user to make a selection via a screen is known.

Moreover, Japanese Patent Application Laid-Open No. 2016-215591 discusses, to perform recording using an appropriate control parameter, measuring a plurality of characteristic values of a recording medium targeted for recording, comparing the measured plurality of characteristic values with a value serving as a criterion, and thus identifying the type of recording medium.

However, the method of allowing the user to make a selection requires the user to select a type of recording medium whenever performing recording, and is thus troublesome.

On the other hand, with regard to the method discussed in Japanese Patent Application Laid-Open No. 2016-215591, for example, an error occurring in a sensor for measuring characteristic values of a recording medium, an individual difference of a recording medium, and a difference in measurement environment affect measured values. Therefore, the method discussed in Japanese Patent Application Laid-Open No. 2016-215591 may be unable to identify a type of recording medium with a degree of accuracy sufficient for a case where a previously prepared criterion has been used, so that the type of recording medium which the user intends to select may not be selected.

SUMMARY

Aspects of the present disclosure are generally directed to increasing the convenience for the user in selecting a type of recording medium.

According to an aspect of the present disclosure, an information processing apparatus includes an acquisition unit configured to acquire a measurement result obtained by a measurement unit measuring a characteristic of a recording medium for use in a recording apparatus, a type reception unit configured to receive information input by a user indicating a type of recording medium selected by the user for use in the recording apparatus, a notification control unit configured to cause a notification unit to notify the user of information by issuing a notification, a mode reception unit configured to receive a mode selected from among a plurality of modes for determining a determined type of recording medium for use in the recording apparatus, wherein the information processing apparatus is configured to perform operations including determining, in a designation mode, the selected type of recording medium indicated by the information received by the type reception unit, and determining, in an automatic determination mode, an automatically determined type of recording medium for use in the recording apparatus without receiving the input user information indicating the recording medium type, a storage unit configured to store the measurement result previously obtained by the measurement unit performing measurement and to store the determined type of recording medium while associating the measurement result and the determined type of recording medium with each other, and a determination unit configured to determine, based on the measurement result stored in the storage unit, whether the mode for determining the determined type of recording medium is able to be changed from the designation mode to the automatic determination mode, wherein, in response to the determination unit determining that the mode is able to be changed from the designation mode to the automatic determination mode, the notification control unit causes the notification unit to issue a prompting notification to prompt the user to change the mode.

Further features of the present disclosure will become apparent from the following description of exemplary embodiments with reference to the attached drawings.

BRIEF DESCRIPTION OF THE DRAWINGS

FIG. 4 is a diagram illustrating a block configuration of a control system of the recording apparatus in the exemplary embodiment.

FIGS. 9A, 9B, 9C, 9D, 9E, 9F, and 9G are diagrams illustrating display forms of the input-output unit in the exemplary embodiment.

FIGS. 11A and 11B are tables showing characteristic values stored in an electrically erasable programmable read-only memory (EEPROM) in the exemplary embodiment.

FIG. 14 is a table showing an example of measured values obtained by measurement in the exemplary embodiment.

FIG. 15 is a table showing a determination result in the recording medium determination processing in the exemplary embodiment.

FIGS. 16A and 16B are tables showing ranking in the exemplary embodiment.

FIGS. 17A, 17B, 17C, and 17D are tables used to explain a method of calculating characteristic values in the exemplary embodiment.

FIGS. 23A and 23B are diagrams illustrating past measured data in the exemplary embodiment.

FIG. 24 is a diagram illustrating determination results in an estimation range in the exemplary embodiment.

FIG. 25 is a diagram illustrating entire determination results in the exemplary embodiment.

FIGS. 26A and 26B are diagrams illustrating examples of displays to prompt the user to switch between modes.

DESCRIPTION OF THE EMBODIMENTS

Overall Configuration

Figure 1A:
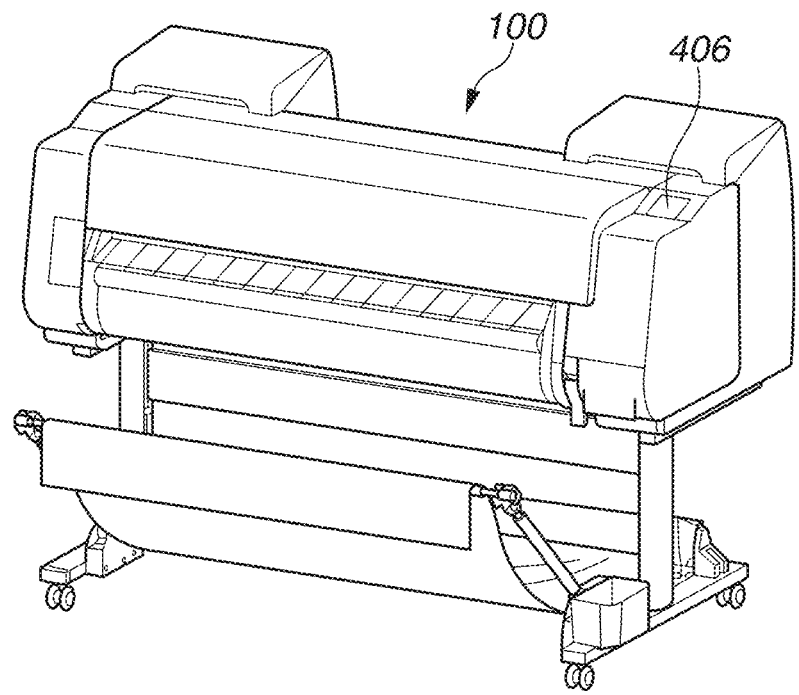
FIGS. 1A and 1B are perspective views illustrating a configuration of a recording apparatus according to an exemplary embodiment.
Figure 1B:
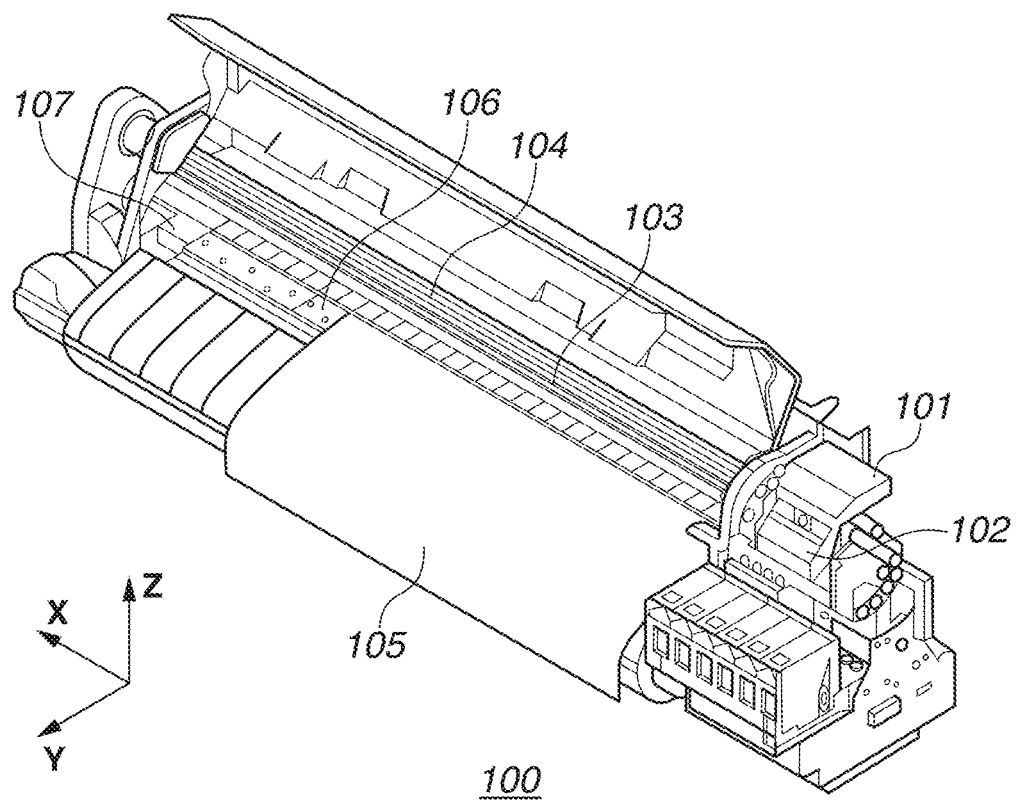

FIGS. 1A and 1B are perspective views illustrating a configuration of a recording apparatus 100, to which casters and a basket used for sheet discharge are mounted. FIG. 1A illustrates an outer appearance of the entire recording apparatus 100, and FIG. 1B illustrates a state of the recording apparatus 100 in which an upper cover is opened to make an internal structure thereof visible. The recording apparatus 100 in the present exemplary embodiment uses an inkjet recording method to perform recording by applying ink droplets as a recording agent onto a recording medium. A recording medium is conveyed with the conveyance direction thereof set to the Y-direction. Then, in the following description, an inkjet recording apparatus equipped with what is called a serial-type recording head, in which a carriage 101 having a recording head 102 mounted thereon is reciprocated along the X-direction, which intersects with the Y-direction, to perform recording, is described. However, an inkjet recording apparatus equipped with what is called a line-type recording head, in which nozzle rows are arranged over a recording width in the conveyance direction of a recording medium, can also be used. Moreover, a multifunction peripheral (MFP) having not only a recording function but also, for example, a scan function, a facsimile (FAX) function, and a transmission function integrated therewith can also be used. Moreover, an electrophotographic type recording apparatus, which uses powder toner as a recording agent, can also be used. In the present exemplary embodiment, the function of an information processing apparatus for performing determination processing for a recording medium to be used, described below, is mounted in the recording apparatus 100.

An input-output unit 406 is provided at an upper portion of the recording apparatus 100. The input-output unit 406 is an operation panel, and displays, on a display screen thereof, a remaining ink amount and candidates for types of recording media, so that the user is allowed to operate keys to select a type of recording medium or perform settings of recording.

The carriage 101 includes an optical sensor 201 (FIG. 2) and the recording head 102, in which a discharge port surface provided with discharge ports for discharging ink is formed. The carriage 101 is configured to be able to be reciprocated, by driving of a carriage motor 415 (FIG. 4), in the X-direction (conveyance direction of the carriage 101) along a shaft 104 via a carriage belt 103. In the present exemplary embodiment, the recording apparatus 100 is able to use the optical sensor 201 to acquire a diffuse reflection characteristic value and a specular reflection characteristic value on the surface of a recording medium 105 and measure a distance between the carriage 101 and the recording medium 105.

The recording medium 105, which is, for example, roll paper, is conveyed in the Y-direction on a platen 106 by a conveyance roller (not illustrated). A recording operation is performed by the recording head 102 discharging ink droplets while the carriage 101 moves in the X-direction on the recording medium 105 conveyed onto the platen 106 by the conveyance roller. When the carriage 101 has moved to the end of a recording region on the recording medium 105, the conveyance roller conveys the recording medium 105 by a predetermined amount to move the region on which next recording scanning is to be performed to a position at which the recording head 102 is able to perform recording. Recording of an image is performed with repetition of the above-described operation.

Configuration of Carriage

Figure 2:
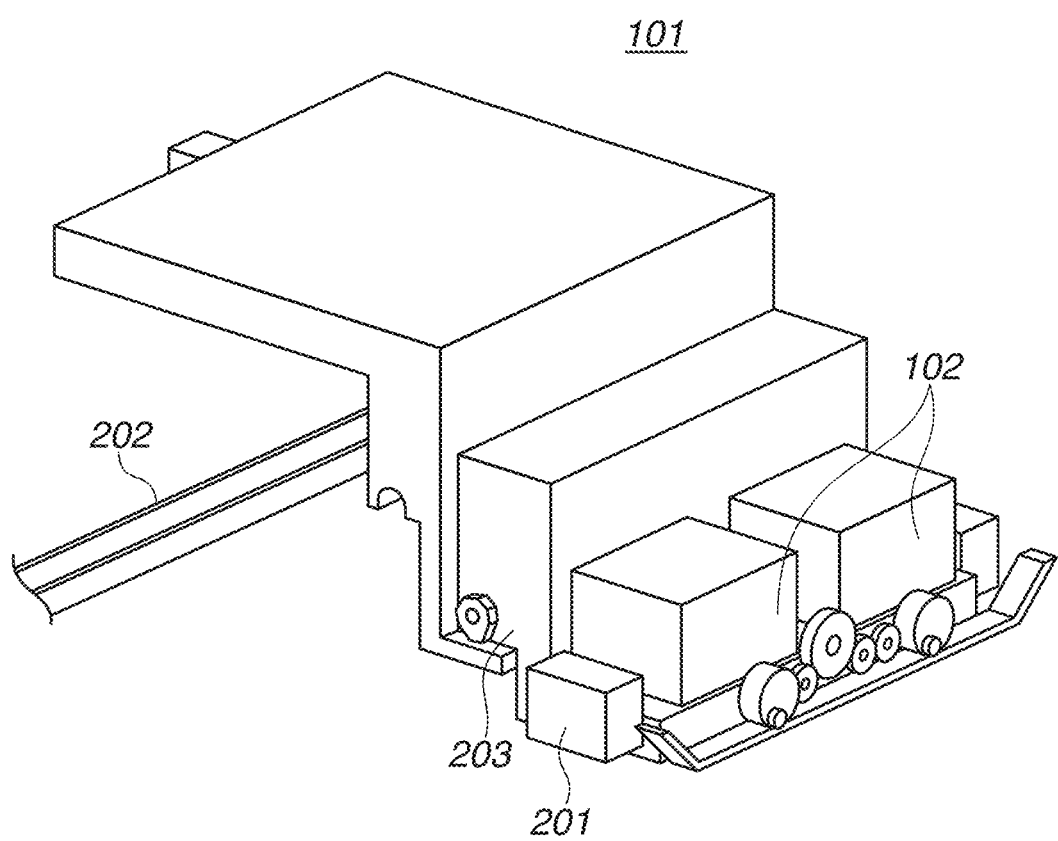
FIG. 2 is a diagram illustrating a configuration of a carriage according to the exemplary embodiment.

FIG. 2 is a diagram illustrating a configuration of the carriage 101. The carriage 101 is configured to include a translator 202 and a head holder 203. The head holder 203 includes the recording head 102 and the optical sensor 201, which is a reflection-type sensor. As illustrated in FIG. 2, the optical sensor 201 is configured to have a bottom surface thereof situated at the same position as or higher than the bottom surface of the recording head 102.

Configuration of Optical Sensor

Figure 3:
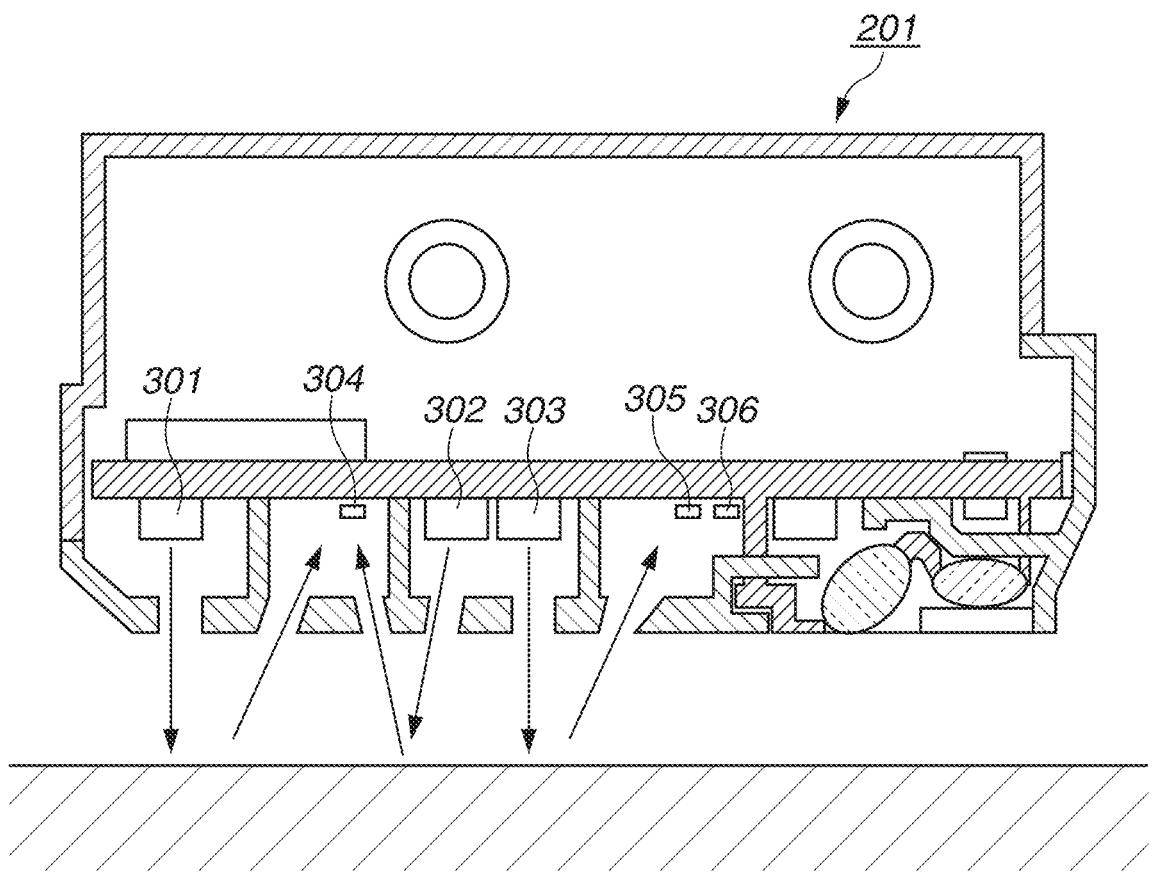
FIG. 3 is a diagram illustrating a configuration of an optical sensor in the exemplary embodiment.

FIG. 3 is a sectional schematic view illustrating a configuration of the optical sensor 201. The optical sensor 201 includes, as optical elements, a first light-emitting diode (LED) 301, a second LED 302, a third LED 303, a first photodiode 304, a second photodiode 305, and a third photodiode 306. The first LED 301 is a light source having an irradiation angle normal (90°) to the surface (measurement surface) of the recording medium 105. The first photodiode 304 receives, at an angle of 45° in the Z-direction, light radiated from the first LED 301 and then reflected from the recording medium 105. Thus, the first LED 301 and the first photodiode 304 form an optical system used to detect what is called a diffuse reflection component of the reflected light from the recording medium 105.

The second LED 302 is a light source having an irradiation angle of 60° in the Z-direction with respect to the surface (measurement surface) of the recording medium 105. The first photodiode 304 receives, at an angle of 60° in the Z-direction, light radiated from the second LED 302 and then reflected from the recording medium 105. Thus, angles for light emission and light reception become equal to each other, so that the second LED 302 and the first photodiode 304 form an optical system used to detect what is called a specular reflection component of the reflected light from the recording medium 105.

The third LED 303 is a light source having an irradiation angle normal (90°) to the surface (measurement surface) of the recording medium 105. The second photodiode 305 and the third photodiode 306 receive light radiated from the third LED 303 and then reflected from the recording medium 105. Since the amounts of light respectively received by the second photodiode 305 and the third photodiode 306 vary according to the distance between the optical sensor 201 and the recording medium 105, the second photodiode 305 and the third photodiode 306 are used to measure the distance between the optical sensor 201 and the recording medium 105.

While, in the present exemplary embodiment, the optical sensor 201 is placed in the carriage 101, another configuration can be employed. For example, the optical sensor 201 can be arranged to be fixed to the recording apparatus 100 or can be a measuring instrument arranged separately from the recording apparatus 100 and provided for measuring characteristic values about, for example, diffuse reflection and specular reflection of a recording medium and transmitting the measured characteristic values to the recording apparatus 100.

Block Diagram

FIG. 4 is a diagram illustrating a block configuration of a control system of the recording apparatus 100. A read-only memory (ROM) 402 is a non-volatile memory and stores, for example, a control program for controlling the recording apparatus 100 and a program for implementing operations in the present exemplary embodiment. The operations in the present exemplary embodiment are implemented by, for example, a central processing unit (CPU) 401 reading out the program stored in the ROM 402 onto a random access memory (RAM) 403 and executing the read-out program. The RAM 403 is also used as a working memory for the CPU 401. An electrically erasable programmable read-only memory (EEPROM) 404 stores data which is to be retained even when the recording apparatus 100 is powered off. At least the CPU 401 and the ROM 402 implement the function of an information processing apparatus for performing recording medium determination processing described below. Moreover, the EEPROM 404 stores characteristic values of each recording medium, which are used as a predetermined criterion, and a category of each recording medium. The term "category" means a group obtained by widely classifying types of recording media, and, in the present exemplary embodiment, is set as one of five groups, i.e., glossy paper, plain paper, coated paper, film paper, and special. For example, a recording medium which is standard glossy paper is classified as a category of glossy paper, and a recording medium which is premium plain paper is classified as a category of plain paper. While the term "recording medium" also includes a medium which is not a paper medium, in the present exemplary embodiment, a notification is issued to the user with use of the term "paper". Characteristic values of each recording medium can be stored not in a storage medium included in the recording apparatus 100 but in an external memory, such as a ROM of a host computer or a server.

An interface (I/F) circuit 410 interconnects the recording apparatus 100 and an external network such as a local area network (LAN). The recording apparatus 100 performs, via the I/F circuit 410, transmission and reception of, for example, various jobs and data with respect to an external apparatus such as a host computer.

The input-output unit 406 includes an input unit and an output unit. The input unit receives, from the user, an instruction for powering-on, an instruction for recording execution, and an instruction for setting various functions. The output unit displays various pieces of device information, such as power-saving mode, and a setting screen for various functions which the recording apparatus 100 is able to execute. In the present exemplary embodiment, the input-output unit 406 is an operation panel provided on the recording apparatus 100, and the input-output unit 406 is connected to a system bus 416 via an input-output control circuit 405 in such a way as to be able to perform transmission and reception of data. In the present exemplary embodiment, the CPU 401 controls the output unit to issue a notification about information.

In addition, the input unit can be a keyboard of an external host computer, and the recording apparatus 100 can be configured to be able to receive a user's instruction from the external host computer. The output unit can be an LED display, a liquid crystal display (LCD) display, or a display connected to a host apparatus. Moreover, in a case where the input-output unit 406 is a touch panel, the recording apparatus 100 is able to receive a user's instruction via software keys. Moreover, the input-output unit 406 can be a loudspeaker and a microphone, so that an input from the user can be set as a voice input and a notification to the user can be set as a voice output.

An information processing apparatus which includes a CPU and a ROM having similar functions to those of the CPU 401 and the ROM 402 and is externally connected to the recording apparatus 100 can be configured to perform recording medium determination processing described below to determine a recording medium for use in the recording apparatus 100.

In the case of performing measurement by the optical sensor 201, an LED control circuit 407 is driven by the CPU 401 in such a manner that predetermined LEDs included in the optical sensor 201 are controlled to perform light emission. Photodiodes included in the optical sensor 201 output signals corresponding to the received light, the output signals are converted into digital signals by an analog-to-digital (A/D) conversion circuit 408, and the digital signals are temporarily stored in the RAM 403. Data which is to be retained even when the recording apparatus 100 is powered off is stored in the EEPROM 404.

A recording head control circuit 411 supplies drive signals corresponding to recording data to a nozzle driving circuit including selectors and switches mounted in the recording head 102, and thus controls a recording operation of the recording head 102 for, for example, drive orders of nozzles. For example, in a case where recording target data has been transmitted from an external apparatus to the I/F circuit 410, the recording target data is temporarily stored in the RAM 403. Then, the recording head control circuit 411 drives the recording head 102 based on recording data obtained by converting the recording target data into recording data for use in recording. At that time, a line feed (LF) motor driving circuit 412 drives an LF motor 413 based on, for example, a bandwidth of the recording data to rotate a conveyance roller connected to the LF motor 413, thus conveying a recording medium. A carriage (CR) motor driving circuit 414 drives a carriage (CR) motor 415, thus causing the carriage 101 to perform scanning via the carriage belt 103.

Data received via the I/F circuit 410 includes not only recording target data but also data about the contents set by a printer driver. Moreover, for example, the recording target data may be received from an external apparatus via the I/F circuit 410 and stored in a storage unit or may be previously stored in a storage unit such as a hard disk. The CPU 401 reads out image data from the storage unit and controls an image processing circuit 409, thus performing conversion (binarization processing) of the image data into recording data for use in the recording head 102. The image processing circuit 409 performs, besides binarization processing, various image processing operations such as color space conversion, horizontal/vertical (HV) conversion, gamma correction, and image rotation.

Method of Selecting Type of Recording Medium

Identifying a type of recording medium 105 targeted for recording leads to setting parameters such as the maximum amount of usage of ink, the height of the recording head, the attraction force of a recording medium to a platen, and the degree of correction of the amount of conveyance of a recording medium. Other parameters can be used as long as they are control parameters which affect characteristics of a recording medium.

In the present exemplary embodiment, there are five modes for use in selecting a type of recording medium, i.e., a fixed mode, a manual mode, an estimation manual mode, an estimation automatic mode, and a barcode mode. Among these modes, each of the manual mode and the estimation manual mode is a designation mode which includes a step of allowing the user to select a type of recording medium. Moreover, each of the estimation automatic mode and the fixed mode is an automatic determination mode which determines a type of recording medium without the user selecting a type of recording medium. Moreover, the barcode mode is a different mode.

The fixed mode automatically determines a type of recording medium previously set by the user as a type of recording medium targeted for recording.

The manual mode displays categories of recording media on the input-output unit 406 and allows the user to select a category and further select a type of recording medium from within the selected category, thus determining a type of recording medium targeted for recording.

The estimation manual mode causes the optical sensor 201 to measure characteristics of the recording medium 105 targeted for recording and displays, on the input-output unit 406, candidates for types of recording media based on a result of the measurement. The estimation manual mode determines a type of recording medium targeted for recording by the user selecting a type of recording medium from the candidates displayed on the input-output unit 406.

The estimation automatic mode causes the optical sensor 201 to measure characteristics of the recording medium 105 targeted for recording and displays, on the input-output unit 406, candidates for types of recording media based on a result of the measurement. In a case where an operation by the user has not been performed for a predetermined time, the estimation automatic mode determines, as a type of recording medium targeted for recording, a type of recording medium displayed as the uppermost candidate. In a case where a type of recording medium has been selected by the user, the estimation automatic mode determines the selected type as a type of recording medium targeted for recording.

In a case where information indicating a type of recording medium is previously recorded as a barcode on the recording medium, the barcode mode determines a type of recording medium by reading the barcode.

Figure 5A:
FIGS. 5A, 5B, 5C, and 5D are diagrams illustrating display forms of an input-output unit in the exemplary embodiment.

The above-mentioned five modes are able to be switched by the user. A home screen which is displayed on the input-output unit 406 is illustrated in FIG. 5A. Furthermore, FIG. 5A illustrates a condition in which an item "main body settings" has been selected from among items displayed in the home screen. When an item is selected, the selected item is highlighted and, then, a next screen is displayed. In FIG. 5A, highlighting is performed by making a background of the item different from the color of the other items and thickening a frame of the item.

Figure 5B:
Figure 5C:
Figure 5D:

When the item "main body settings" is selected in the home screen, the CPU 401 displays a main body setting screen such as that illustrated in FIG. 5B. Touching a button 40 illustrated in FIG. 5B enables scrolling down displaying of the screen. Touching a button "STOP" leads to switching from displaying of the main body setting screen illustrated in FIG. 5B to displaying of the home screen illustrated in FIG. 5A. When an item "paper relevant settings" is selected in the main body setting screen, as illustrated in FIG. 5B, the CPU 401 highlights the item "paper relevant settings" and then displays a paper relevant setting screen such as that illustrated in FIG. 5C. Furthermore, FIG. 5C illustrates a condition in which an item "method of selecting paper type" has been selected in the paper relevant setting screen. In the paper relevant setting screen, the CPU 401 displays items for performing settings of recording medium information which is currently set in the recording apparatus 100, such as an item for setting the height of the recording head 102 in performing recording and an item for setting the cutting speed in cutting roll paper. When the item "method of selecting paper type" is selected in the paper relevant setting screen illustrated in FIG. 5C, the CPU 401 displays a setting screen for the method of selecting paper type such as that illustrated in FIG. 5D. The user is allowed to select one of the above-mentioned modes in selecting a type of recording medium via the displayed setting screen. At this time, the input-output unit 406 functions as a mode reception unit. When an item "automatic selection from estimation result" illustrated in FIG. 5D is selected, the estimation automatic mode is executed, and, when an item "manual selection from estimation result" is selected, the estimation manual mode is executed.

Mode Shared Flow

Figure 6:
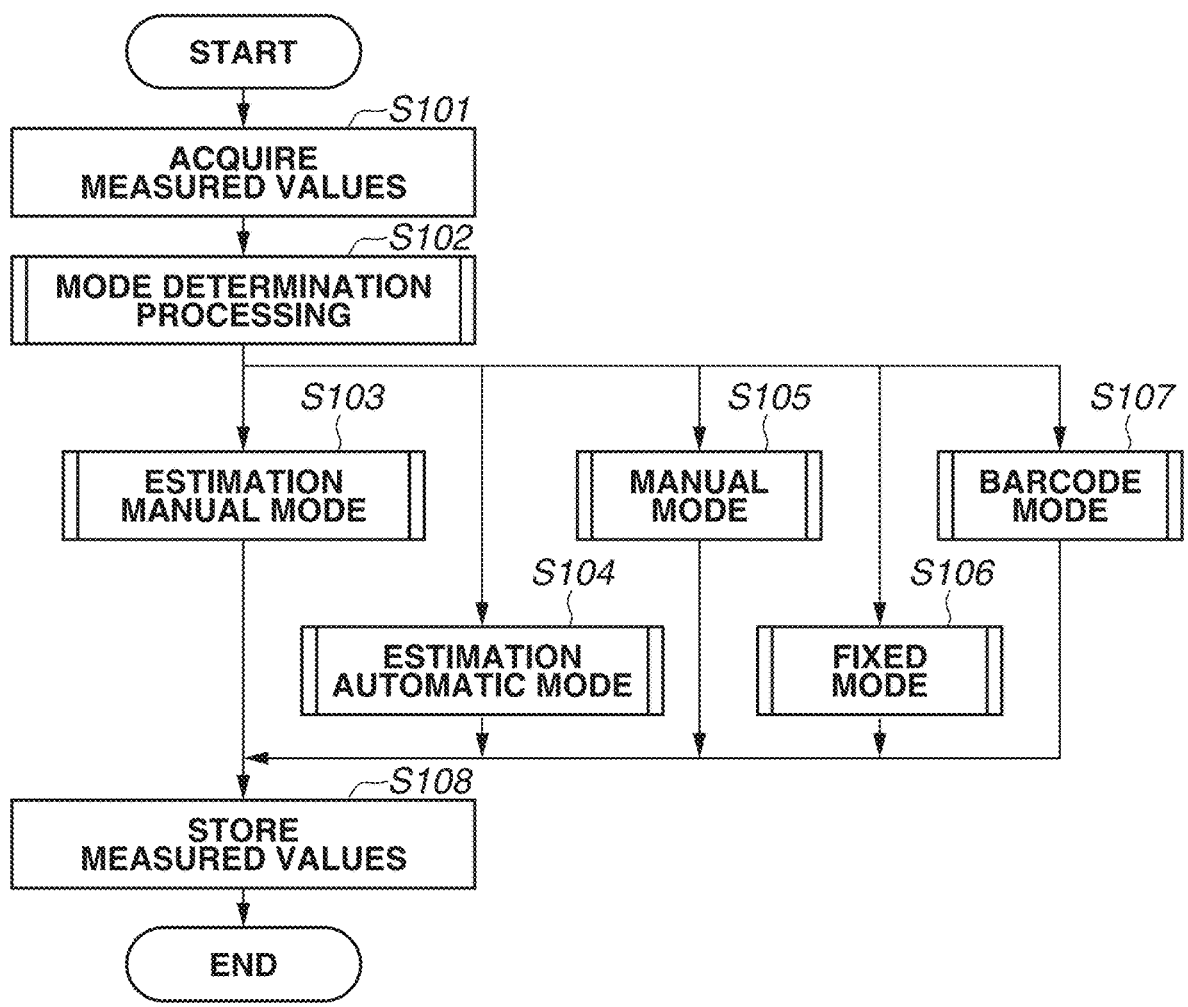
FIG. 6 is a flowchart illustrating recording medium determination processing in the exemplary embodiment.

FIG. 6 is a flowchart illustrating recording medium determination processing for determining a type of recording medium targeted for recording. The recording medium determination processing is processing which is performed after a mode in selecting a type of recording medium is set by the user.

The following recording medium determination processing acquires measured values as new information about characteristic values of a type of recording medium which the user has selected as a type of recording medium targeted for recording, and changes characteristic values which are previously determined based on the measured values in such a way as to bring the previously determined characteristic values close to the measured values. Performing such learning leads to progressively acquiring characteristic values which enable selecting a type of recording medium with a higher degree of accuracy.

With regard to the fixed mode, the manual mode, and the barcode mode, in displaying information on the input-output unit 406, measurement results of characteristics of a recording medium measured by the optical sensor 201 are not used. However, in any of the above-mentioned modes, measurement of characteristics of a recording medium by the optical sensor 201 and learning that is based on the measurement are performed. Performing measurement and learning in modes other than the modes requiring measured values facilitates acquiring characteristic values which enable discriminating a type of recording medium with a high degree of accuracy. While, in the present exemplary embodiment, learning about characteristic values of a recording medium is performed in all of the modes, a configuration in which learning is performed in only the barcode mode, in which there is a high possibility of a correct recording medium being selected, can be employed.

Processing in each of steps S101 to S108 illustrated in FIG. 6 is implemented, for example, by the CPU 401 illustrated in FIG. 4 reading out a program stored in the ROM 402 onto the RAM 403 and executing the program. Moreover, the recording medium determination processing can be performed by software included in the host apparatus. In the present exemplary embodiment, the input-output unit 406 is an operation panel included in the recording apparatus 100, and a notification about candidates for recording media is performed by displaying names of the recording media on the operation panel. Then, a type of recording medium is determined by the user selecting a type of recording medium targeted for recording from among the displayed names. At this time, the input-output unit 406 functions as a type reception unit. The input-output unit 406 can be a display connected to a host apparatus and the host apparatus. Moreover, in a case where the input-output unit 406 is a loudspeaker having a microphone function capable of inputting and outputting voices, a notification about candidates for recording media is performed by the loudspeaker, and selection of a type of recording medium is performed by the user inputting a voice indicating the name of the type of recording medium or a symbol corresponding thereto to the microphone.

Figure 9A:
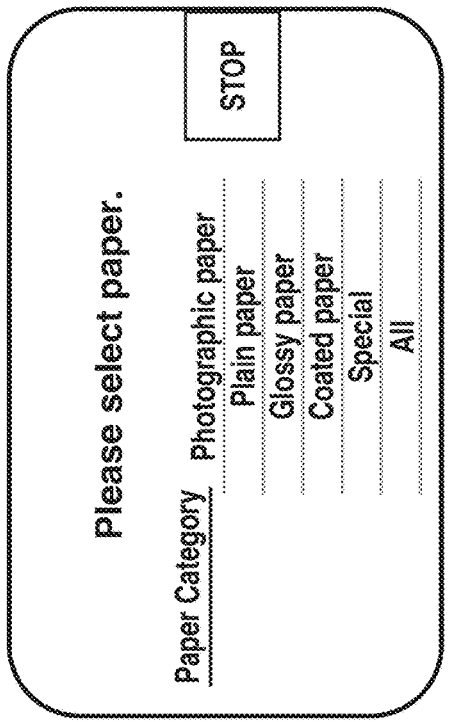

Upon receiving, via the operation panel, which is the input-output unit 406, an instruction for starting paper feed from the user, the CPU 401 performs paper feed processing for the recording medium 105. FIG. 9A illustrates an example of displaying of an operation panel for receiving inputting of an instruction for starting paper feed processing. The operation panel is a touch panel which allows touch input to be performed by the user. When an item "yes" is touched, paper feed is started.

When the item "yes" is selected in FIG. 9A and paper feed is then started, the recording medium 105 is conveyed by the conveyance roller to a position on the platen 106 which is able to be detected by the optical sensor 201. Upon conveyance of the recording medium 105, the carriage 101 moves on the recording medium 105 in the X-direction, and then in step S101, the CPU 401 acquires, via the optical sensor 201, a diffuse reflection value and a specular reflection value about the recording medium 105 and a value of the thickness of the recording medium 105 (hereinafter referred to as a "paper thickness"). The diffuse reflection value corresponds to the degree of whiteness of a recording medium, and the specular reflection value corresponds to the degree of glossiness of a recording medium. The width of a recording medium in the X-direction can be used as characteristics of a recording medium to perform recording medium determination processing. Even a single position can be used to measure characteristics of a recording medium, or an average of measurement results obtained at a plurality of positions can also be used. Moreover, measurement of characteristics can be performed by the optical sensor 201 being in a stopped state or being moving. The measured values are temporarily stored in a memory such as the RAM 403.

Then, in step S102, the CPU 401 determines a mode in determining a type of recording medium. The mode is determined from a mode selected by the user, information about recording media selected in the past, and measured values.

The CPU 401 advances the processing to any one of step S103 to step S107 depending on the mode determined in step S102, and then in the applicable step, determines a type of recording medium according to the determined mode.

Then, in step S108, the CPU 401 stores the measured values obtained in the applicable one of steps S103 to S107 in a table stored in the EEPROM 404.

In the following description, processing operations corresponding to respective modes in steps S103 to S107 are described.

Estimation Manual Mode

In the estimation manual mode, the CPU 401 acquires measured values as new information about characteristic values of a type of recording medium which the user has selected, and changes characteristic values which are previously determined based on the measured values in such a way as to bring the previously determined characteristic values close to the measured values. By performing such learning, the CPU 401 progressively acquires characteristic values which enable selecting a type of recording medium with a higher degree of accuracy.

Figure 10:
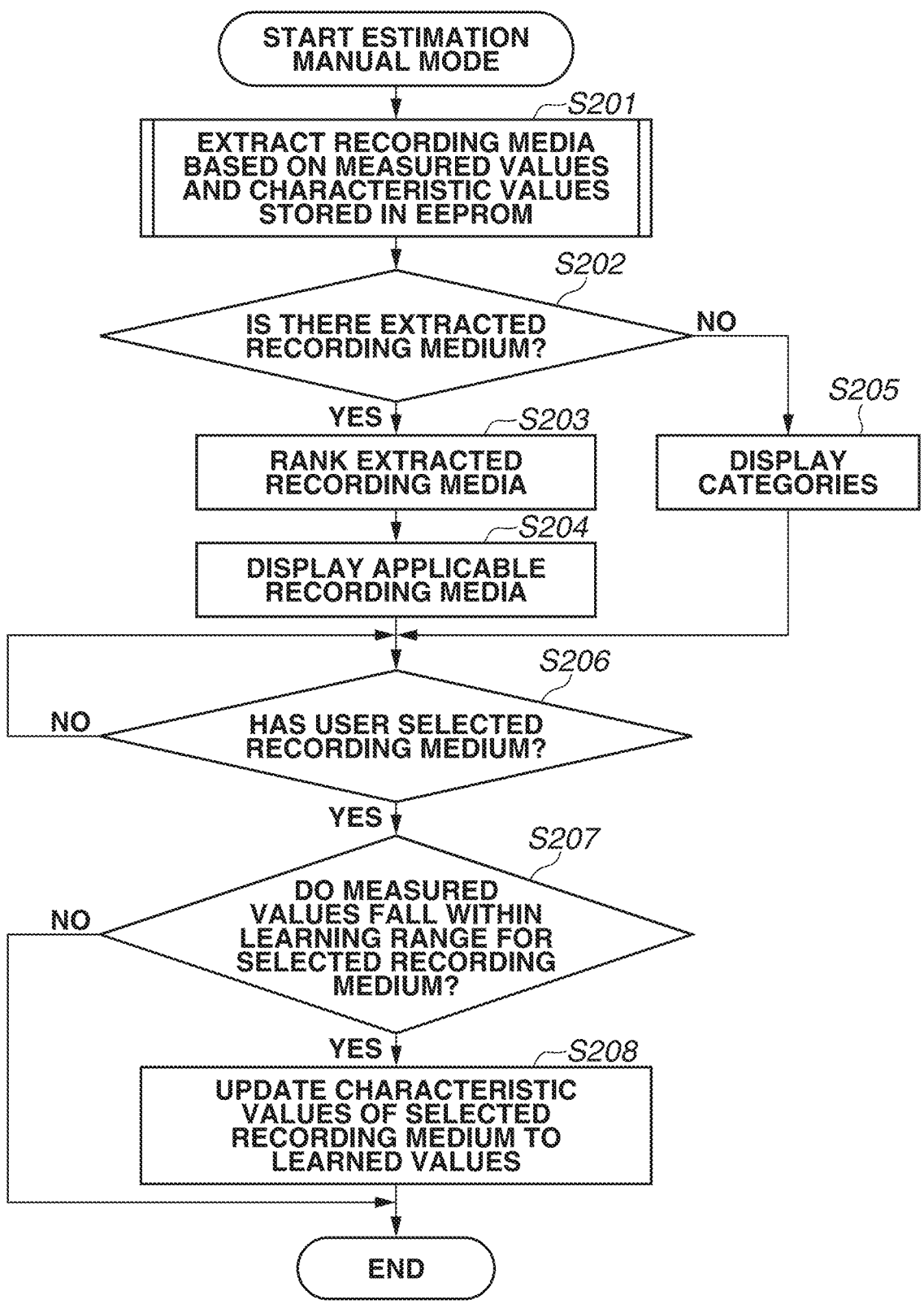
FIG. 10 is a flowchart illustrating an estimation manual mode in the exemplary embodiment.

FIG. 10 is a flowchart about the estimation manual mode in step S103.

Figure 12:
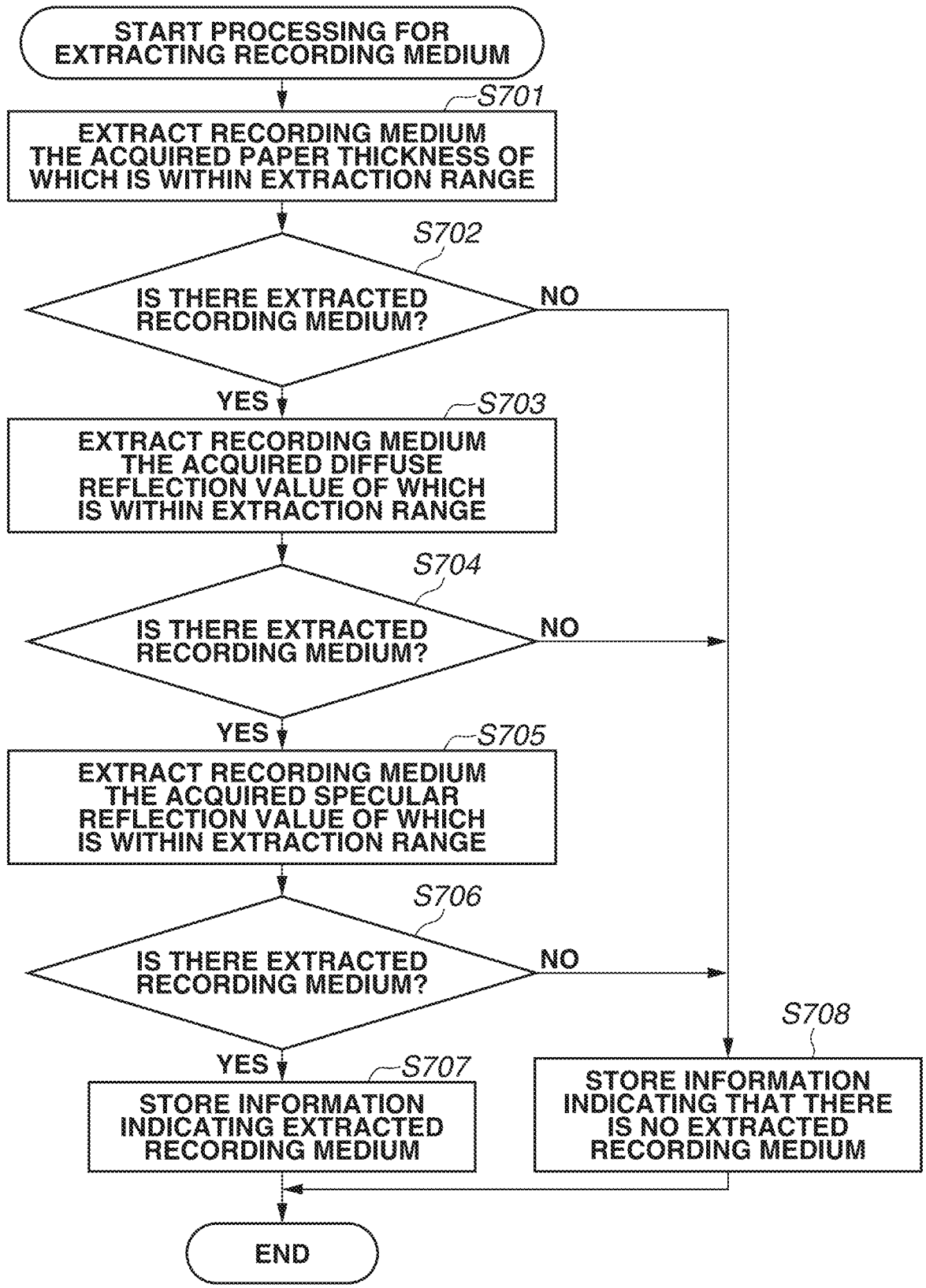
FIG. 12 is a flowchart illustrating extraction processing for a recording medium in the exemplary embodiment.

In step S201, the CPU 401 reads out, from the memory, the measured values acquired in step S101 illustrated in FIG. 6, compares the read-out measured values with characteristic values of respective predetermined recording media stored in the EEPROM 404, and thus extracts candidates for types of recording media. FIG. 12 is a flowchart of processing for extracting types of recording media in step S201.

The CPU 401 extracts types of recording media in which the degree of the measured values corresponding to the shown characteristic values is higher than a predetermined degree. Details thereof are as follows. FIG. 11A shows characteristic values of respective recording media stored in the EEPROM 404. If each characteristic value is an initial value at this time, "characteristic value=$T_0$" is obtained. The CPU 401 compares this value serving as a reference value with each measured value and thus discriminates a type of recording medium. A range for this reference value is set as an extraction range. Each of the diffuse reflection value and the specular reflection value is a value obtained by A/D-converting, with 10 bits, an output voltage output from the optical sensor 201 receiving light. The extraction range is a range from a minimum value to a maximum value across a middle value of each characteristic value of a recording medium.

In step S701, the CPU 401 extracts a type of recording medium the acquired paper thickness of which is within the extraction range of paper thickness stored in the EEPROM 404 (storage unit). In the present exemplary embodiment, the extraction range of paper thickness is ±50 micrometers (μm) from the middle value thereof.

Then, in step S702, the CPU 401 determines whether there is any type of recording medium extracted in step S701.

If it is determined that there is no extracted type of recording medium (NO in step S702), then in step S708, the CPU 401 stores, in the RAM 403, information indicating that there is no extracted type of recording medium, and then ends the extraction processing for recording media.

If, in step S702, it is determined that there is an extracted type of recording medium (YES in step S702), then in step S703, the CPU 401 extracts a type of recording medium the acquired diffuse reflection value of which is within the extraction range of diffuse reflection value stored in the EEPROM 404 (storage unit). As illustrated in FIG. 11A, the extraction range of diffuse reflection value is a range of ±5 from the middle value thereof. In step S704, the CPU 401 determines whether there is any type of recording medium extracted in step S703. If it is determined that there is no extracted type of recording medium (NO in step S704), then in step S708, the CPU 401 stores, in the RAM 403, information indicating that there is no extracted type of recording medium, and then ends the extraction processing for recording media.

If, in step S704, it is determined that there is an extracted type of recording medium (YES in step S704), then in step S705, the CPU 401 extracts a type of recording medium the acquired specular reflection of which is within the extraction range of specular reflection value stored in the EEPROM 404 (storage unit). As illustrated in FIG. 11A, the extraction range of specular reflection value is a range of ±5 from the middle value thereof. In step S706, the CPU 401 determines whether there is any type of recording medium extracted in step S705. If it is determined that there is no extracted type of recording medium (NO in step S706), then in step S708, the CPU 401 stores, in the RAM 403, information indicating that there is no extracted type of recording medium, and then ends the extraction processing for recording media.

If, in step S706, it is determined that there is an extracted type of recording medium (YES in step S706), then in step S707, the CPU 401 stores information indicating the extracted type of recording medium in the RAM 403 and then ends the extraction processing for recording media.

Upon ending the extraction processing for recording media in step S201, then in step S202, the CPU 401 determines whether there is any extracted recording medium. The CPU 401 performs this determination by reading out information stored in the RAM 403 in the recording medium extraction processing illustrated in FIG. 12.

If, in step S202, it is determined that there is an extracted type of recording medium (YES in step S202), then in step S203, the CPU 401 sets priorities to the extracted types of recording media in the order of characteristic values thereof being closer to the measured values. Details of the method of determining the order of displaying are described below.

Figure 9B:
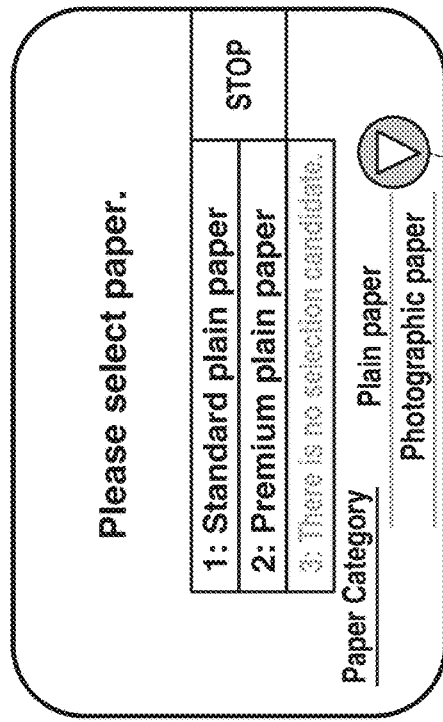
Figure 9C:
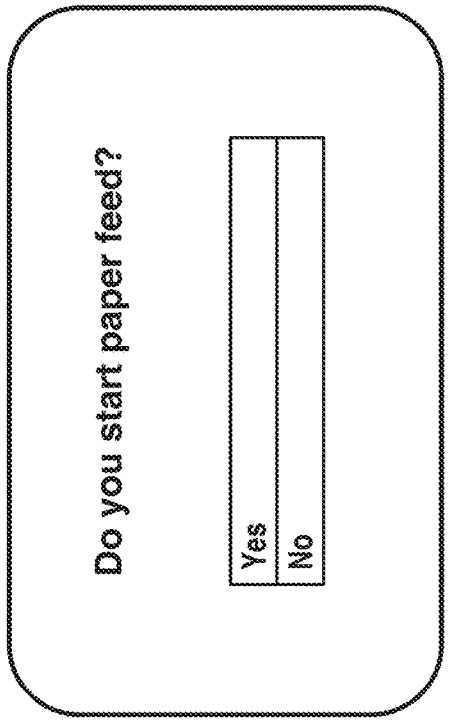
Figure 9D:
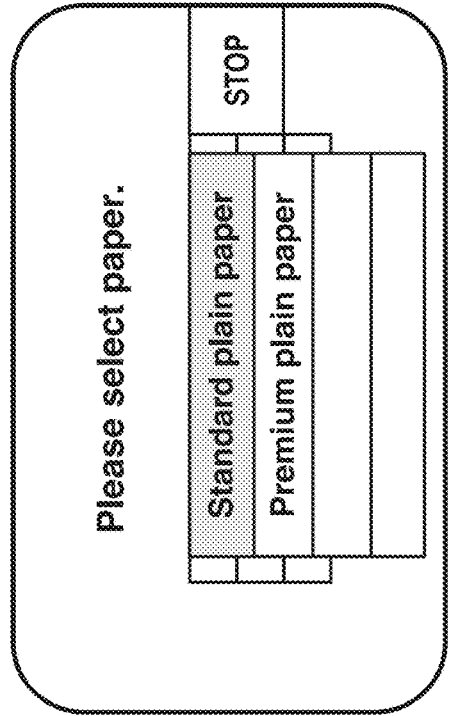

In step S204, the CPU 401 displays names of the types of recording media from the top in descending order of priorities determined in step S203, as illustrated in FIG. 9D.

In FIG. 9D, symbols "1" to "3" are assigned to the right of names of recording media in descending order of priority. Selection of a type of recording medium is performed by touching an item of the displayed name of a recording medium. Here, standard plain paper, to which number "1" is assigned, is highest in priority. The symbol only needs to be a character which enables seeing the height of priority and can also be other than numerals. Moreover, the method of displaying is not limited to this and only needs to a method which enables the user to recognize the order of priority.

While, in FIG. 9D, up to three candidates of recording media from the top are able to be displayed, since only two types of recording media have been extracted, only up to two types of recording media are displayed in FIG. 9D. In the third field, a remark "There is no selection candidate." is displayed pale (or dark) in such a way to be inconspicuous against the above-mentioned two names of recording media, so that the user is notified that there is no third candidate. For example, in a case where the color of the background of the operational panel is black, names of two recording media are displayed in white, and the content "There is no selection candidate." is displayed in gray, which is lower in luminance than white. Paper categories are displayed below displaying of the content "There is no selection candidate." displayed as in this way. This enables the user to, in a case where a recording medium which the user desires is not present in the names of recording media displayed on the input-output unit 406, select an individual type of recording medium from among other types of recording media. In the present exemplary embodiment, in the paper categories, a category to which the first-priority type of recording medium belongs is displayed at the top. A category close in characteristics is displayed at the higher place in such a way as to be likely be selected, so that, even in a case where a recording medium which the user desires is not present in the candidates for recording media, the trouble of selecting a desired type of recording medium can be reduced.

Figure 13A:
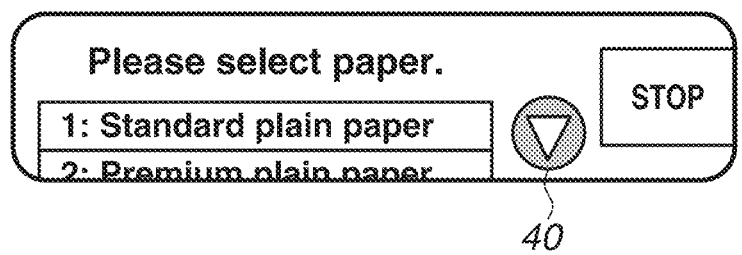
FIGS. 13A, 13B, and 13C are diagrams illustrating other display forms of the input-output unit.
Figure 13B:
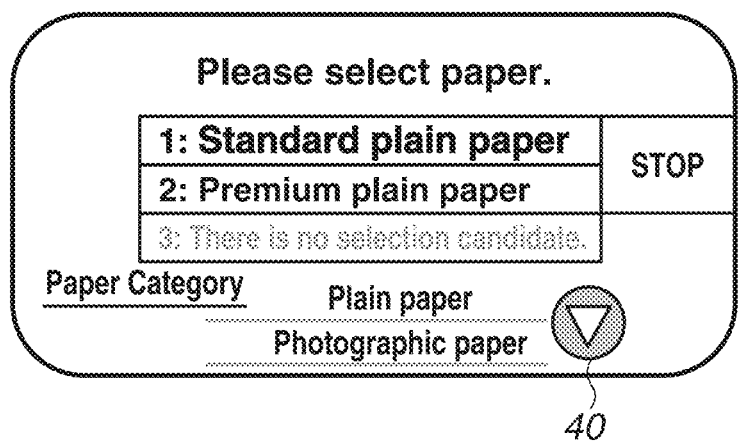
Figure 13C:
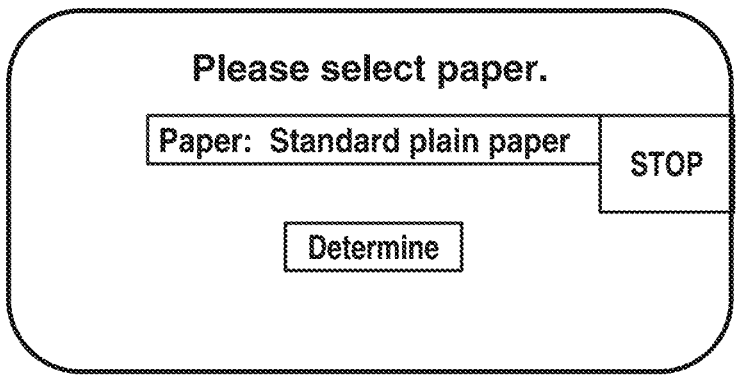

FIGS. 13A, 13B, and 13C illustrate methods of displaying candidates for types of recording media in the input-output unit 406 according to other configurations. As illustrated in FIG. 13A, in a case where it is not possible to display all of the extracted candidates for types of recording media at one time, low-order candidates can be displayed by performing, for example, a scrolling operation. Moreover, even if candidates are not displayed in order from the high-order candidate, the priority order only needs to be able to be recognized by the user. The name of the highest-order type of recording medium can be displayed at the center of the operation panel, or, as illustrated in FIG. 13B, the highness or lowness of priority can be expressed by, for example, enlarging the size of characters showing the name of a high-priority recording medium or making such characters bold. Moreover, while categories are displayed below displaying of "paper categories", categories can be displayed without displaying of "paper categories". Moreover, not categories but types of recording media other than the candidates can be displayed below the candidates for recording media.

Moreover, as illustrated in FIG. 13C, only the highest-priority recording medium can be displayed. In a case where the user wants to select another extracted type of recording medium, the user can select a portion of the item for a recording medium displayed as "standard plain paper" in FIG. 13C. Then, a method in which, when such a portion is selected, a screen such as that illustrated in FIG. 9D is displayed to enable the user to select another recording medium can be employed.

If, in step S202, it is determined that there is no extracted recording medium (NO in step S202), then in step S205, the CPU 401 displays paper categories on the operation panel as illustrated in FIG. 9B. Upon receiving inputting of a category selected by the user, the CPU 401 displays types of recording media included in the selected category as illustrated in FIG. 9C. Then, the CPU 401 receives inputting about a type of recording medium selected from among the displayed types of recording media. Such inputting is performed by the user touching an item in which the name of the type of recording medium is displayed. In FIG. 9B, separately from categories of recording media, an item indicating "all" is displayed at the bottom. When this item "all" is displayed, all of the types of recording media are displayed in a predetermined order. All of the types of recording media can be displayed in order from a type of recording medium closest to the recently used, i.e., last-used, type of recording medium.

If, in step S206, it is determined that the user has selected a type of recording medium via the input-output unit 406 (YES in step S206), then in step S207, the CPU 401 determines whether the measured values are within respective learning ranges of the selected type of recording medium. Here, the learning range is described. Characteristic values which enable increasing the accuracy of extraction are able to be obtained by changing characteristic values of the type of recording medium selected by the user based on the measured values. However, since, if learning is performed based on measured values greatly different from predetermined characteristic values (or characteristic values changed via a learning process), incorrect values may be learned, a learning range, which is a range of measured values to be learned, is previously set. In the present exemplary embodiment, the learning range is a range including a range two times the extraction range. The learning range is a range used to change characteristic values. In a case where the measured values fall within a learning range of the selected type of recording medium, the characteristic values are changed based on the measured values. While, in the present exemplary embodiment, the learning range is set as a range from the middle value of characteristic values to a predetermined value, this is a range of values two times a difference between the middle value and the minimum value or a difference between the middle value and the maximum value. For example, the extraction range of specular reflection values of standard glossy paper illustrated in FIG. 11A is a range between "95" and "105", which are ±5 from the middle value. Since the learning range is a range of ±10 from the middle value, which is two times ±5, the learning range is a range between "90" and "110". In the same way, with regard to the diffuse reflection value and the paper thickness, since the learning range also takes a range two times the extraction range, a learning range of diffuse reflection values of standard glossy paper is a range between "90" and "100" and a learning range of paper thicknesses of standard glossy paper is "90" and "290". The learning range is not limited to this, but can be, for example, a range equal to the extraction range or can be set as a learning range differing depending on characteristics or types of recording media. If it is determined that the measured values fall within the respective learning ranges of the selected type of recording medium (YES in step S207), then in step S208, the CPU 401 updates the characteristic values of the type of recording medium selected in step S206 to values changed by learning based on the measured values, and then stores the updated values in the EEPROM 404. Upon performing the above-described operation, the CPU 401 ends the recording medium determination processing in the estimation manual mode. If it is determined that the measured values do not fall within the respective learning ranges (NO in step S207), then, without updating the characteristic values of the selected type of recording medium, the CPU 401 ends the recording medium determination processing in the estimation manual mode. Details of updating of the characteristic values are described below.

When the recording medium determination processing ends and a recording preparation is completed, the CPU 401 enters into a state of receiving a recording job from the user, and, upon receiving the recording job, the CPU 401 starts recording. A configuration in which the CPU 401 receives a recording job before a recording preparation is completed, stores the received recording job in the RAM 403, and starts recording after the recording preparation is completed can be employed. Moreover, a configuration in which, in a case where the type of recording medium selected and input by the user via the input-output unit 406 is different from a type of recording medium for a job transmitted from a host computer to the recording apparatus 100, the CPU 401 does not update the characteristic values stored in the EEPROM 404 can also be employed.

In the extraction processing for recording media illustrated in FIG. 12, the CPU 401 extracts a type of recording medium having the applicable paper thickness in step S701, extracts a type of recording medium having the applicable diffuse reflection value in step S703, and extracts a type of recording medium having the applicable specular reflection value in step S705. The order of performing extraction is not limited to this, and a configuration in which, for example, the CPU 401 first extracts a type of recording medium having the applicable diffuse reflection value can be employed.

In a case where the optical sensor 201 is provided at a measurement apparatus which is separate from the recording apparatus 100, first, the optical sensor 201 measures characteristics of a recording medium set in the measurement apparatus. Then, a configuration in which the measurement apparatus transmits the acquired characteristic values to the recording apparatus 100 and the CPU 401 of the recording apparatus 100 extracts types of recording media and displays candidates for recording media on the input-output unit 406 can be employed.

In the following description, the method of determining the order of displaying in step S203 and the updating of characteristic values in step S208 in the recording medium determination processing are described with reference to specific examples. Characteristics of a recording medium acquired in step S101 are (diffuse reflection value, specular reflection value, paper thickness)=(103, 98, 225), as illustrated in FIG. 14. FIG. 15 illustrates a table showing results of determination performed in step S201. A recording medium a measured value of which falls within the extraction range is assigned "Yes", and a recording medium the measured value of which does not fall within the extraction range is assigned "No". A recording medium having a characteristic value which does not fall within the extraction range is not subjected to determination itself in the next processing. This is expressed as "Do not perform determination" in FIG. 15.

In step S701, the CPU 401 extracts standard glossy paper, standard semiglossy paper, premium glossy paper, and heavy glossy paper, each of which is a type of recording medium within the extraction range of paper thicknesses of which illustrated in FIG. 11A the acquired paper thickness "225" falls. Since there is an extracted type of recording medium, the result of determination in step S702 is "YES", so that the CPU 401 advances the processing to step S703.

In step S703, the CPU 401 extracts, from the recording media extracted in step S701, standard glossy paper, standard semiglossy paper, and heavy glossy paper, each of which is a type of recording medium within the extraction range of diffuse reflection values of which illustrated in FIG. 11A the measured diffuse reflection value "103" falls. Since there is an extracted type of recording medium, the result of determination in step S704 is "YES", so that the CPU 401 advances the processing to step S705.

In step S705, the CPU 401 extracts a type of recording medium within the extraction range of specular reflection values of which illustrated in FIG. 11A the measured specular reflection value "98" falls, from the recording media extracted in step S703. Here, standard glossy paper, standard semiglossy paper, and heavy glossy paper are extracted. Since there is an extracted type of recording medium, the result of determination in step S706 is "YES", so that the CPU 401 advances the processing to step S707. In step S707, the CPU 401 stores information indicating the types of recording media extracted in step S705 in the RAM 403.

Since, in step S202, there is an extracted type of recording medium, the CPU 401 advances the processing to step S203. In step S203, the CPU 401 performs ranking in such a way as to set a recording medium having characteristic values closer to the measured values as a recording medium higher in priority order. Then, in step S204, the CPU 401 displays names of the extracted types of recording media from the top in order from a recording medium highest in priority order.

FIG. 16A is a diagram used to explain a method of determining orders in step S203. In the present exemplary embodiment, the CPU 401 calculates the closeness between a middle value of each characteristic and a measured value thereof by the following calculation method:

$$|(\text{measured value} - \text{middle value of characteristic})/(\text{maximum value of characteristic} - \text{middle value of characteristic})|$$

Instead of the maximum value of characteristic, the minimum value thereof can be used.

For example, with regard to a specular reflection value of standard glossy paper, the closeness is calculated as |(103−100)/(105−95)|=0.6. With regard to the types of recording media extracted in step S201, the CPU 401 performs the above calculation, and then adds together values of the closeness to the respective characteristics. A recording medium the total value of which is smaller corresponds to a recording medium having characteristic values closer to the measured values. Thus, the CPU 401 determines that a recording medium the total value of which is smaller is a higher-order type of recording medium, and performs displaying on the input-output unit 406. Here, as illustrated in FIG. 9E, the CPU 401 performs displaying in the order of standard glossy paper, heavy glossy paper, and standard semiglossy paper.

Processing in step S207 which is performed in a case where standard semiglossy paper, which is at the third place in display order, has been selected by the user in step S206 is described.

In step S207, the CPU 401 determines whether the measured values acquired in step S101 fall within a learning range for standard semiglossy paper, which is the selected type of recording medium. In a case where the measured values fall within respective learning ranges of all of the characteristics, i.e., diffuse reflection values, specular reflection values, and paper thicknesses, the CPU 401 determines that the measured values fall within the learning range for standard semiglossy paper. As illustrated in FIG. 11A, the extraction range of specular reflection values for standard semiglossy paper is a range between "94" and "104", which is a range of ±5 with respect to the middle value "99". As mentioned above, the learning range is set as a range two times the extraction range with respect to the same middle value as that of the extraction range. The learning ranges of specular reflection values for standard semiglossy paper is a range between "89" and "109", which is a range of ±10 with respect to the middle value "99". Similarly, the learning range of diffuse reflection values for standard semiglossy paper is a range between "85" and "105", and the learning range of paper thicknesses for standard semiglossy paper is a range between "90" and "290". Since all of the measured values (diffuse reflection value, specular reflection value, paper thickness)=(103, 98, 225) fall within the respective learning ranges mentioned above, the CPU 401 advances the processing to step S208.

In step S208, the CPU 401 updates characteristic values of the selected type of recording medium based on the measured values. The characteristic values shown in FIG. 11A are characteristic values obtained before being updated, and FIG. 14 shows the measured values. In the present exemplary embodiment, the CPU 401 brings characteristic values of the type of recording medium close to the measured values at a predetermined rate. Here, since measurement errors may be included in the measured values, rather than directly replacing the measured values as characteristic values at one time, the CPU 401 can perform learning a plurality of times to gradually lessen a difference between the measured values and the characteristic values in such a manner that the difference becomes smaller step by step at a predetermined rate. An example of that can be expressed by the following generalized equation:

Characteristic value obtained by being updated($Tn+1$)=(measured value($R$)−characteristic value ($Tn$))×$a$+characteristic value obtained before being updated($Tn$)

Here, a denotes a value indicating a rate at which to bring the characteristic value close to the measured value. Assuming that the rate at which to bring the characteristic value close to the measured value is 25%, the middle value for specular reflection value becomes as follows. For example, in the case of Tn=T0 (initial value), a value T1 is obtained by performing updating for the first time.

In the case of R=103 and Tn=T0=99, the value T1 is obtained as follows.

$$T1=(103-99)\times0.25+99=100$$

Similarly, the CPU 401 updates characteristic values for diffuse reflection value and paper thickness. The result of updating is shown in FIG. 11B. In the extraction range, while a range of ±5 with respect to the middle value for specular reflection value and diffuse reflection value and a range of ±50 with respect to the middle value for paper thickness are not changed, not only the middle value is updated but also the minimum value and the maximum value are updated in conformity with the middle value. The updated characteristic values are substituted for the original characteristic values and stored as characteristic values of standard semiglossy paper in the EEPROM 404, and can be used for the recording medium determination processing the next and subsequent times. With the above process performed, the recording medium determination processing ends.

While, in the above-mentioned example, at the time of updating characteristic values, bringing the characteristic values close to the measured values is performed at a rate of 25%, the rate for bringing the characteristic values close to the measured values is not limited to this and can be a rate larger than 0% and less than or equal to 100%. Moreover, the rate for bringing the characteristic values close to the measured values can be set for each type of recording medium or can be set for each characteristic.

In the state in which the characteristic values have been updated as illustrated in FIG. 11B, the CPU 401 re-performs measurement of standard semiglossy paper, which is a recording medium characteristics of which are (diffuse reflection value, specular reflection value, paper thickness) =(103, 98, 225). FIG. 16B illustrates a result obtained by performing ranking in the order of the characteristic values being close to the measured values. Since the characteristic values of standard semiglossy paper have been updated, the order of standard semiglossy paper has become the first place. Therefore, in step S204, standard semiglossy paper, which is the measured recording medium, is displayed as the highest-order recording medium on the input-output unit 406, and thus becomes more likely to be selected by the user.

Moreover, while types of recording media are displayed for notification in the order of the characteristic values being close to the measured values, another method can be employed. In a case where usage history information about a recording medium which was used is previously stored in, for example, the EEPROM 404, such history information can be used. For example, the type of recording medium extracted by the recording medium determination processing illustrated in FIG. 12 is set as a recording medium higher in priority order which was used after the recording medium indicated by the history information, so that names of types of recording media high in priority order can be displayed in order from the top.

Moreover, as another method of reflecting the measured values in characteristic values of a type of recording medium, an average value of measured values obtained by measurements performed N times in the past can be set as characteristic values. FIGS. 17A, 17B, 17C, and 17D are diagrams used to explain a method of setting characteristic values obtained by measurements performed three times in the past. Here, such a method is described with a specular reflection value of standard semiglossy paper taken as an example. FIG. 17A illustrates a case where, in step S206, standard semiglossy paper has not been selected even once. In FIG. 17A, since "99", which is a value at initial setting, is input as values obtained at the past three times and an average value thereof is also "99", the characteristic value is set as "99". In FIG. 17B, when standard semiglossy paper has been selected, a measured value "103" is input as a measured value one time before. An average value "100.3" obtained with the measured value "103" being input is set as a characteristic value which is to be used next and subsequent times. FIG. 17C illustrates a case where standard semiglossy paper has been further selected, and "104" is input as a measured value one time before. Then, "102", which is an average value obtained at this time, is set as a characteristic value which is to be used next and subsequent times. FIG. 17D illustrates a case where standard semiglossy paper has been further selected from the state illustrated in FIG. 17C, and "102" is input as a measured value one time before. Then, "103", which is an average value obtained at this time, is set as a characteristic value which is to be used next and subsequent times.

Estimation Automatic Mode

Figure 18:
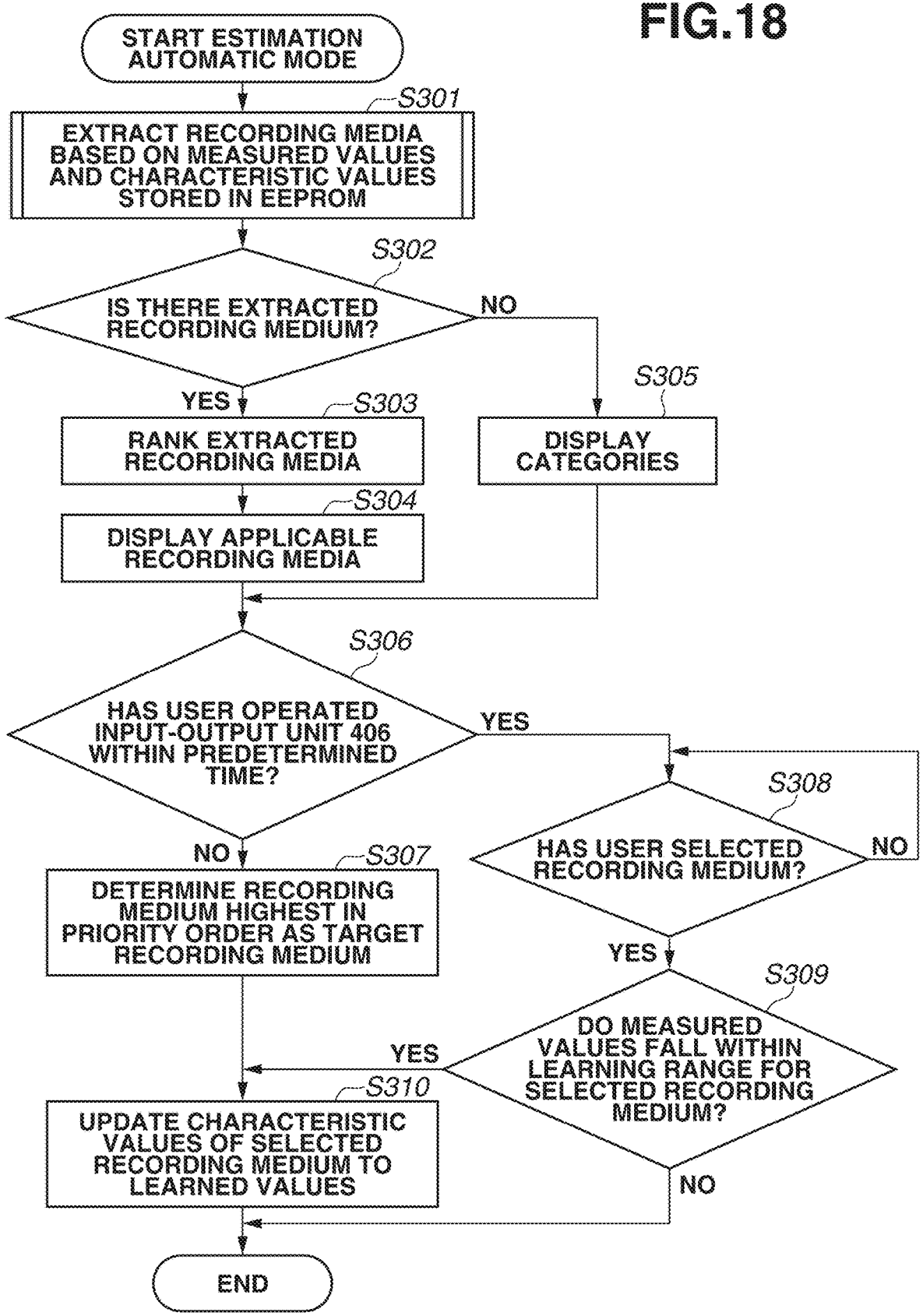
FIG. 18 is a flowchart illustrating an estimation automatic mode in the exemplary embodiment.

FIG. 18 is a flowchart about the estimation automatic mode in step S104.

In steps S301 to S303 and S305, the CPU 401 performs processing operations similar to those in steps S201 to S205 in the estimation manual mode illustrated in FIG. 10.

In step S304, the CPU 401 displays names of the types of recording media from the top in descending order of priorities determined in step S303, as illustrated in FIG. 9F. The CPU 401 displays, together with candidate types of recording media, a comment "Paper No. 1 will be automatically fed." to notify the user that, when selecting a type of recording medium highest in priority order, the user does not need to perform any operation. Moreover, the CPU 401 further displays a comment "You are allowed to select paper from the list." to notify the user that the user is allowed to select a type of recording medium other than the type of recording medium highest in priority order.

If, in step S306, it is determined that the user has not operated the input-output unit 406 within a predetermined time (NO in step S306), then in step S307, the CPU 401 determines, as the target type of recording medium 105, a type of recording medium highest in priority order from among the types of recording media displayed in step S304. Then, the CPU 401 advances the processing to step S310.

If, in step S306, it is determined that the user has operated the input-output unit 406 within the predetermined time (YES in step S306), then in step S308, the CPU 401 determines whether the user has selected a type of recording medium as the target type of recording medium 105. If, in step S308, it is determined that the user has selected a type of recording medium (YES in step S308), then in step S309, the CPU 401 determines whether the measured values fall within the respective learning ranges of the selected type of recording medium. In steps S309 and S310, the CPU 401 performs processing operations similar to those in steps S207 and S208 illustrated in FIG. 10. If it is determined that the measured values do not fall within the respective learning ranges (NO in step S309), then, without updating the characteristic values, the CPU 401 ends the recording medium determination processing in the estimation automatic mode. If it is determined that the measured values fall within the respective learning ranges (YES in step S309), the CPU 401 advances the processing to step S310.

In step S310, the CPU 401 updates the characteristic values of the selected type of recording medium to values changed by learning based on the measured values, and then stores the updated values in the EEPROM 404. Upon performing the above-described operation, the CPU 401 ends the recording medium determination processing in the estimation automatic mode.

Manual Mode

Figure 19:
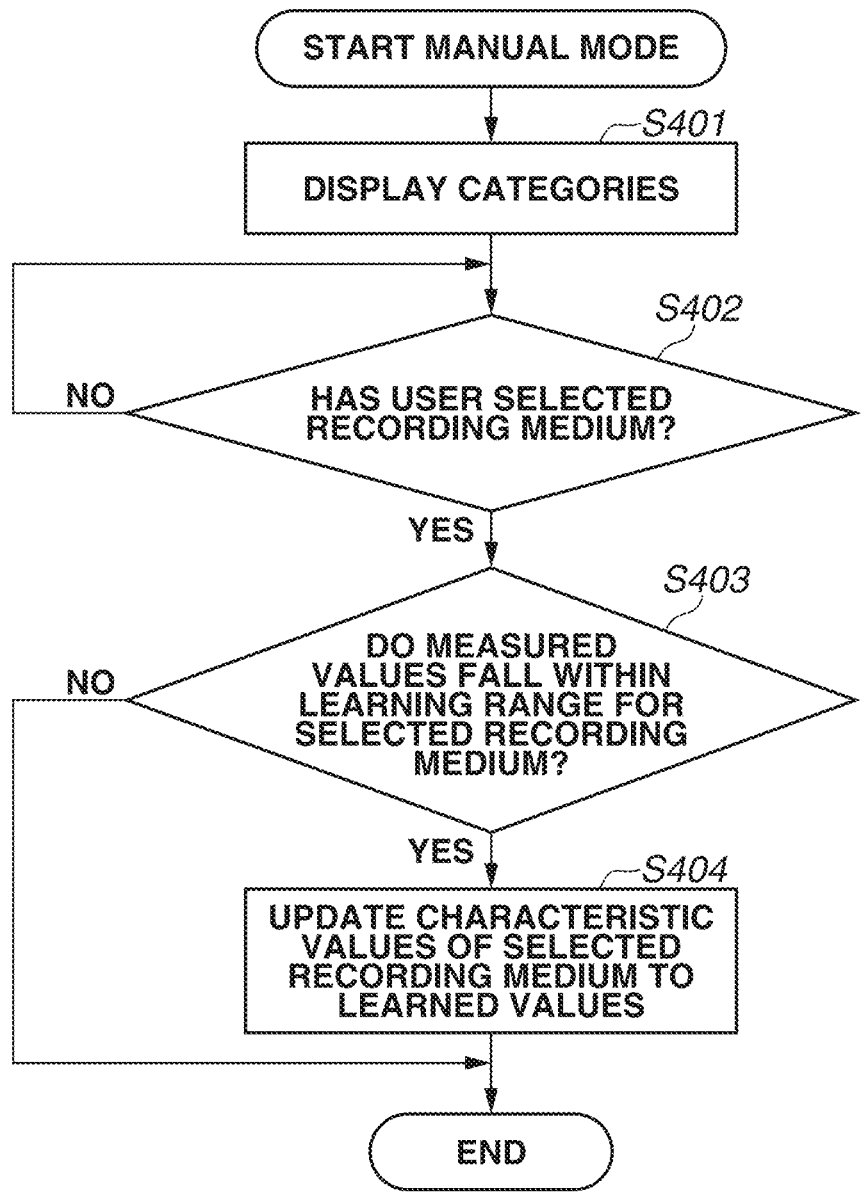
FIG. 19 is a flowchart illustrating a manual mode in the exemplary embodiment.

FIG. 19 is a flowchart about the manual mode in step S105.

In step S401, the CPU 401 displays categories of recording media, such as those illustrated in FIG. 9B, on the input-output unit 406. In the present exemplary embodiment, a configuration in which the order of displaying the categories is a predetermined order is employed. Besides, in a case where usage history information about a recording medium which was used is previously stored in, for example, the EEPROM 404, a category to which a recently used recording medium indicated by the history information belongs can be displayed at the top. Moreover, a recently used type of recording medium indicated by the history information can be displayed at the top and a category to which the indicated type of recording medium belongs can be displayed below the indicated type of recording medium. Moreover, instead of categories, all of the types of recording media can be displayed.

When the user has selected a category, types of recording media belonging to the category selected by the user are displayed as illustrated in FIG. 9C. If it is determined that the user has selected a recording medium from among the displayed types of recording media (YES in step S402, then in step S403, the CPU 401 determines whether the measured values fall within the respective learning ranges of the selected recording medium. In steps S403 and S404, the CPU 401 performs processing operations similar to those in steps S207 and S208 illustrated in FIG. 10. If it is determined that the measured values do not fall within the respective learning ranges (NO in step S403), then, without updating the characteristic values, the CPU 401 ends the recording medium determination processing in the manual mode. If it is determined that the measured values fall within the respective learning ranges (YES in step S403), then in step S404, the CPU 401 updates the characteristic values of the type of recording medium selected in step S402 to values changed based on the measured values, and then stores the updated values in the EEPROM 404. Upon performing the above-described operation, the CPU 401 ends the recording medium determination processing in the manual mode.

Fixed Mode

In the case of using the fixed mode, before the recording medium determination processing is started, the user selects the fixed mode and previously selects a type of recording medium which is to be used in a fixed manner. The type of recording medium which has been set is then stored in the EEPROM 404. Here, in the following description, standard glossy paper is assumed to have been previously set.

Figure 20:
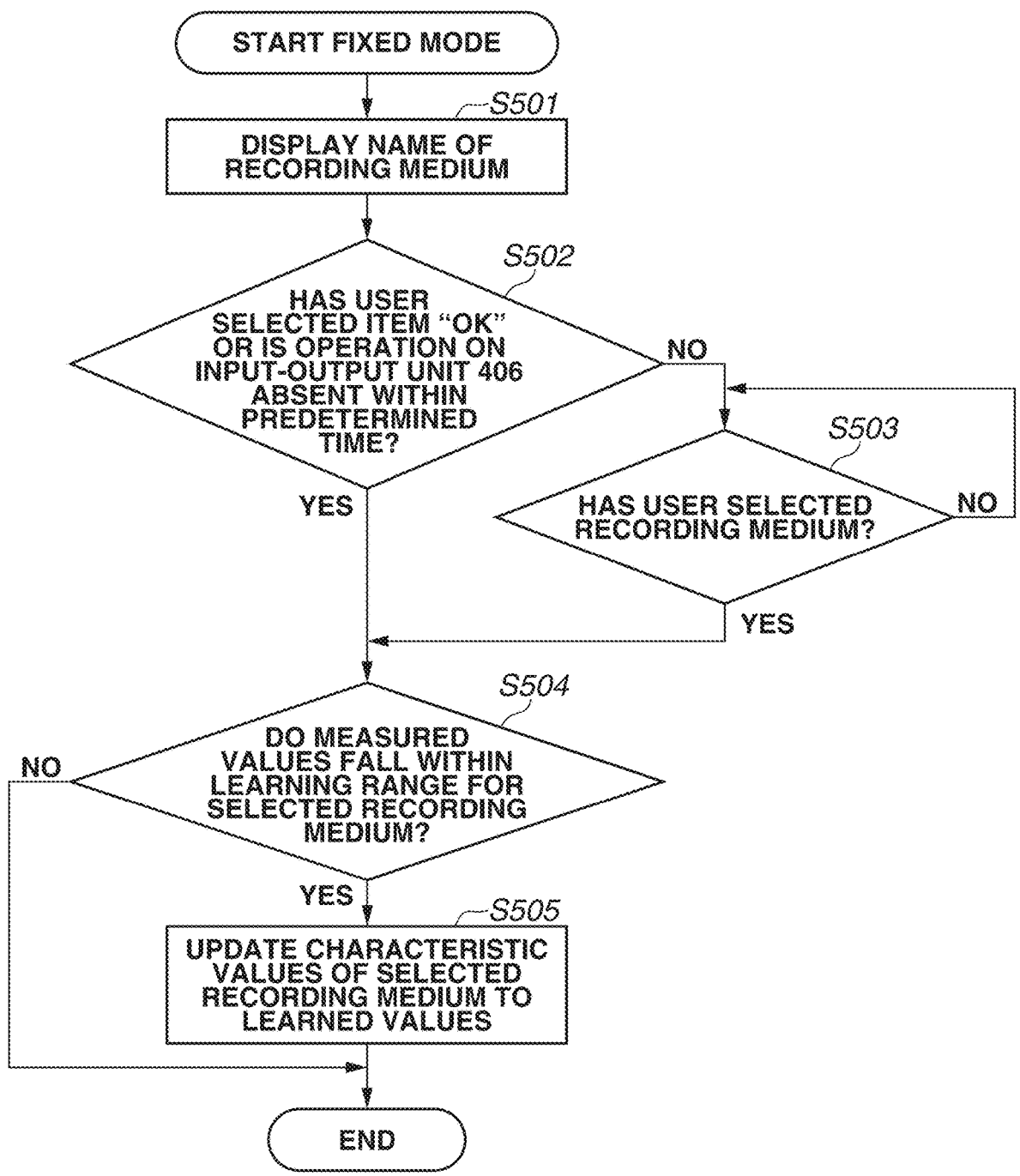
FIG. 20 is a flowchart illustrating a fixed mode in the exemplary embodiment.

FIG. 20 is a flowchart about the fixed mode in step S106.

In step S501, the CPU 401 displays the name of the previously set type of recording medium on the input-output unit 406, as illustrated in FIG. 9G.

If, in step S502, it is determined that the user has performed no operation on the input-output unit 406 within a predetermined time or has selected an item "OK" illustrated in FIG. 9G (YES in step S502), the CPU 401 advances the processing to step S504.

If, in step S502, it is determined that an item "paper type" has been selected within the predetermined time (NO in step S502), the CPU 401 displays categories of recording media as illustrated in FIG. 9B, so that the user is allowed to select a type of recording medium which is not previously set. Then, if, in step S503, it is determined that a type of recording medium has been selected by the user (YES in step S503), the CPU 401 advances the processing to step S504.

In steps S504 and S505, the CPU 401 performs processing operations similar to those in steps S207 and S208 illustrated in FIG. 10. In step S504, the CPU 401 determines whether the measured values fall within the respective learning ranges of the selected recording medium. If it is determined that the measured values do not fall within the respective learning ranges (NO in step S504), then, without updating the characteristic values, the CPU 401 ends the recording medium determination processing in the fixed mode. If it is determined that the measured values fall within the respective learning ranges (YES in step S504), then in step S505, the CPU 401 updates the characteristic values of the selected type of recording medium to values changed based on the measured values, and then stores the updated values in the EEPROM 404. Upon performing the above-described operation, the CPU 401 ends the recording medium determination processing in the fixed mode.

Barcode Mode

Figure 22A:
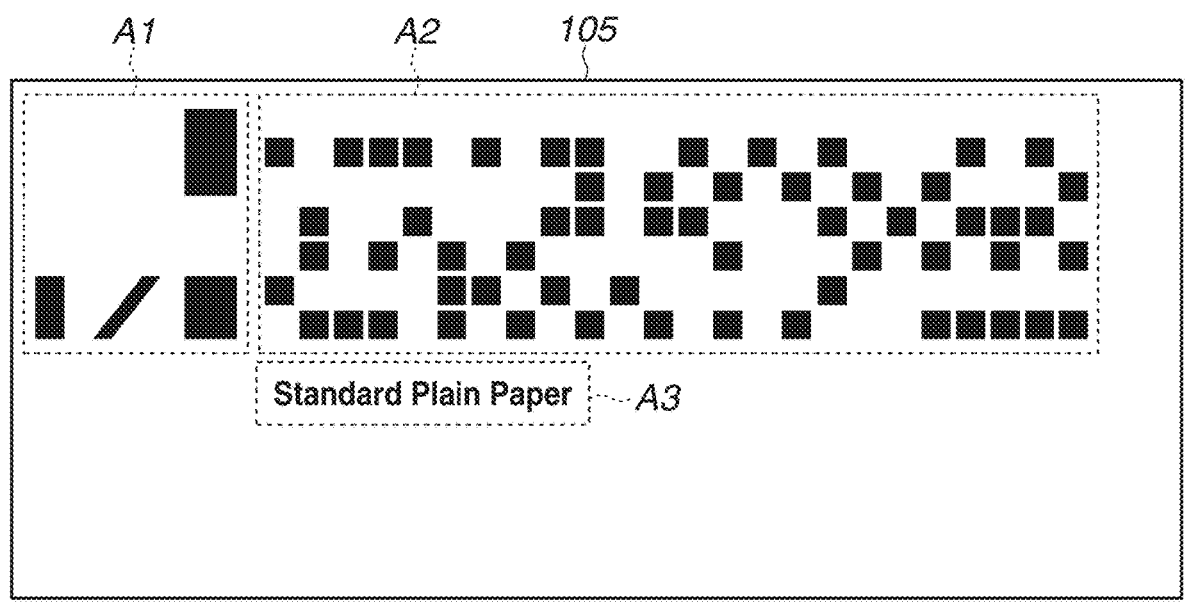
FIGS. 22A and 22B are diagrams illustrating barcodes to be recorded on a recording medium in the exemplary embodiment.

The barcode mode is a mode which is mainly used for roll paper. In the following description, a recording medium targeted for recording is assumed to be roll paper. The recording medium is attached to the recording apparatus 100 to be used for recording. When, in the barcode mode, the recording medium is detached from the recording apparatus 100 by the user or is stopped from being used and replaced with another type of recording medium, a barcode such as that illustrated in FIG. 22A is recorded on the recording medium. The type of recording medium illustrated in FIG. 22A is standard plain paper. The barcode is divided into an area A1, in which a pattern for adjusting a reading position, an area A2, in which information about the type of recording medium is recorded as a barcode, and an area A3, in which the name of the type of recording medium is recorded. The barcode only needs to be a configuration which enables identifying a type of recording medium with use of information recorded on the recording medium, and can be, for example, a QR code.

Figure 21:
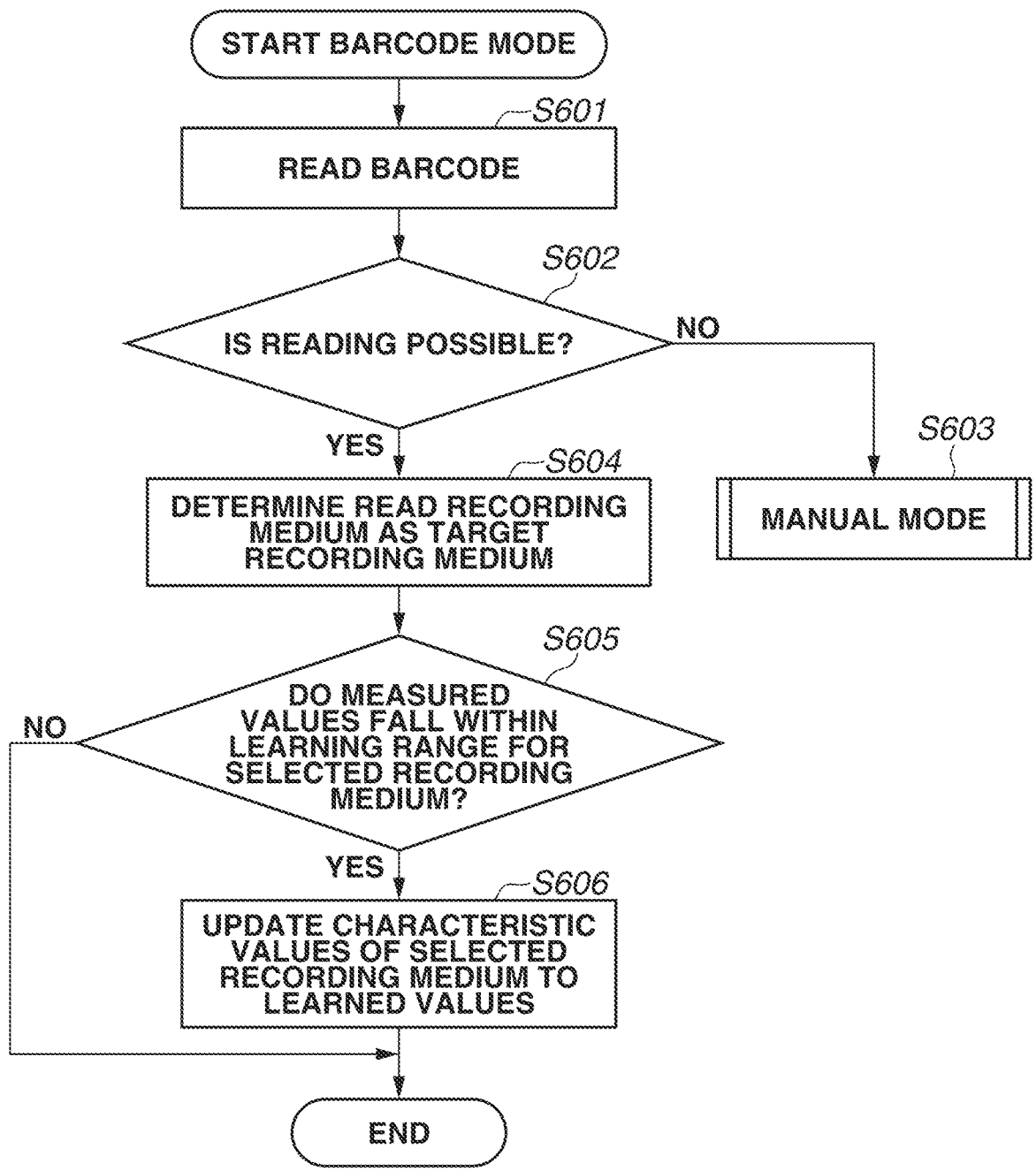
FIG. 21 is a flowchart illustrating a barcode mode in the exemplary embodiment.

FIG. 21 is a flowchart about the barcode mode in step S107.

Figure 22B:
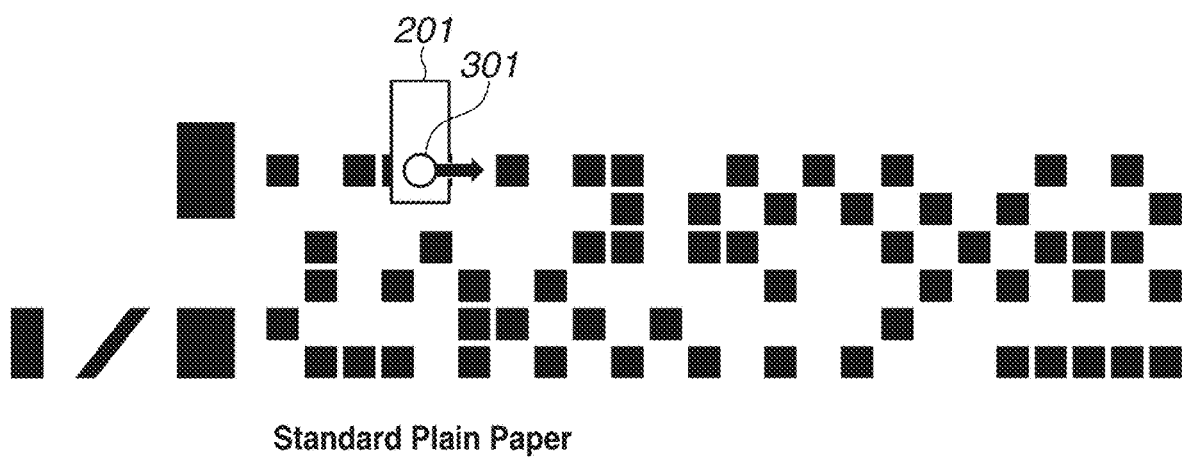

In step S601, the CPU 401 causes the optical sensor 201 to read a barcode recorded on a recording medium 105 targeted for recording, such as that illustrated in FIG. 22A. FIG. 22B is a schematic view illustrating the manner in which the optical sensor 201 is reading the barcode. While the carriage 101 is moving, the optical sensor 201 reads the barcode by causing the first LED 301 to emit light onto the recording medium and causing the first photodiode 304 to detect a diffuse reflection component coming from the recording medium.

In step S602, the CPU 401 determines whether reading of the barcode is possible. If it is determined that reading of the barcode is possible (YES in step S602), then in step S604, the CPU 401 determines the read type of recording medium as the recording medium 105 targeted for recording. If it is determined that reading of the barcode is impossible (NO in step S602), then in step S603, the CPU 401 executes the manual mode illustrated in FIG. 19.

In a case where the CPU 401 has determined the type of recording medium in step S604, then in steps S605 and S606, the CPU 401 performs processing operations similar to those in steps S207 and S208 illustrated in FIG. 10. In step S605, the CPU 401 determines whether the measured values fall within the respective learning ranges of the selected recording medium. If it is determined that the measured values do not fall within the respective learning ranges (NO in step S605), then, without updating the characteristic values, the CPU 401 ends the recording medium determination processing in the barcode mode. If it is determined that the measured values fall within the respective learning ranges (YES in step S605), then in step S606, the CPU 401 updates the characteristic values of the selected type of recording medium to values changed based on the measured values, and then stores the updated values in the EEPROM 404. Upon performing the above-described operation, the CPU 401 ends the recording medium determination processing in the barcode mode.

Figure 7:
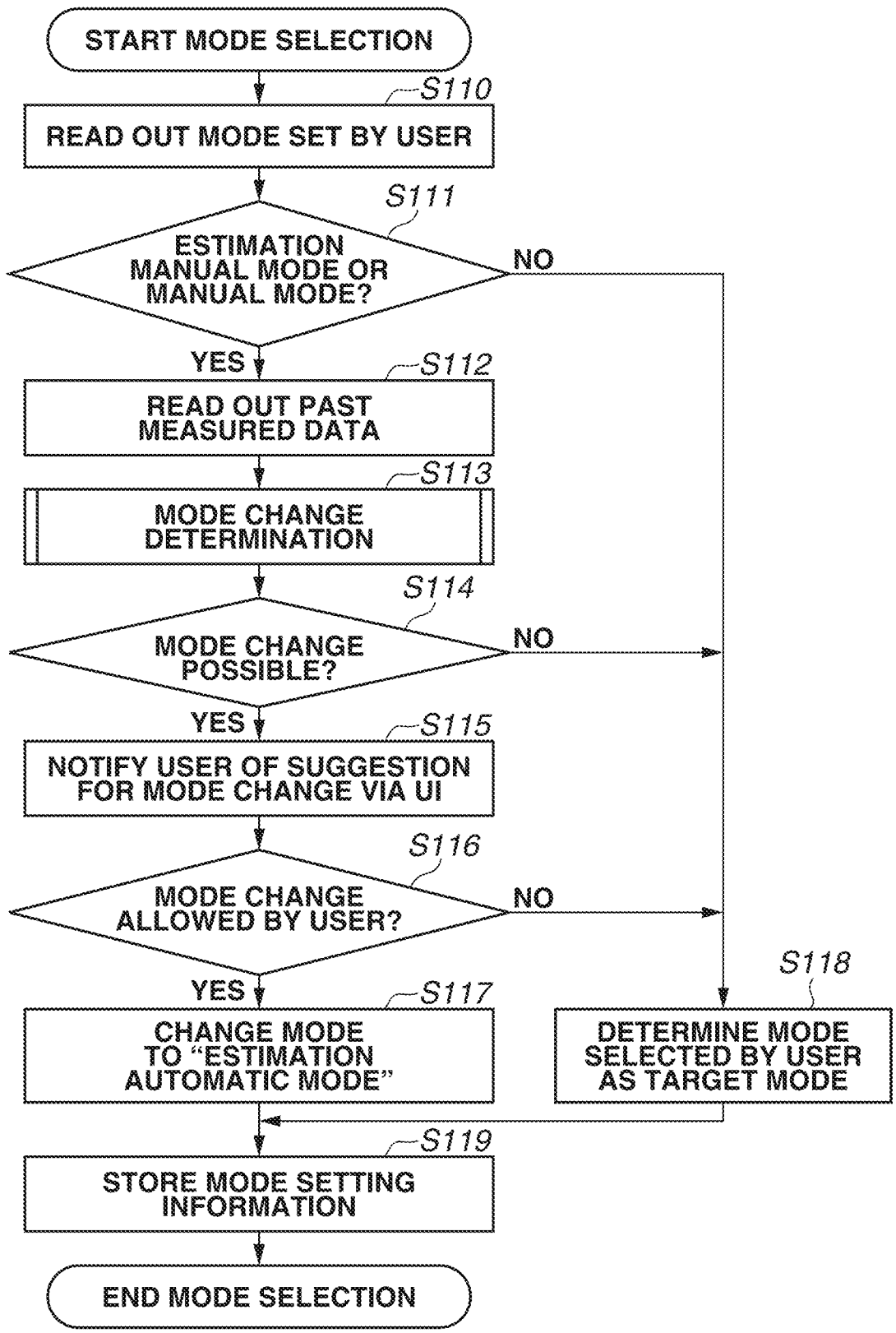
FIG. 7 is a flowchart illustrating mode determination processing in the exemplary embodiment.

FIG. 7 is a flowchart illustrating the mode determination processing in step S102. When the mode selection has been performed, then in step S110, the CPU 401 reads out the mode set by the user from the EEPROM 404.

If, in step S111, the mode read out in step S110 is the fixed mode, the barcode mode, or the estimation automatic mode (NO in step S111), the user does not need to directly select a type of recording mode as described below. Therefore, the CPU 401 advances the processing to step S118, in which the CPU 401 causes the currently set mode to remain unchanged.

If the read-out mode is the estimation manual mode or the manual mode (YES in step S111), then in step S112, the CPU 401 reads out past measured data from the EEPROM 404. The EEPROM 404 is capable of storing a plurality of pieces of past measured data in association with types of recording media, and such past measured data is formed as illustrated in FIGS. 23A and 23B. Specifically, in a table for each type of recording medium, past measured data about respective parameters of specular reflection, diffuse reflection, and paper thickness, which are parameters for use in determining a type of recording medium, is stored. When a type of recording medium has been finally determined in step S108 illustrated in FIG. 6, such data is stored in a table for the determined type of recording medium. Since the number of pieces of data which are able to be stored is a fixed number (in the present exemplary embodiment, assumed to be "6"), each table has a configuration in which, in a case where the number of pieces of data has exceeded the amount available to be stored, values in the table are progressively updated in such a manner that the oldest data is updated with the latest data.

After reading out past measured data in step S112, then in step S113, the CPU 401 performs mode change determination. The mode change determination is a sequence for determining whether, while, at present, the user is performing final selection of a type of recording medium, it is possible to change the current mode to a mode for automatically performing final selection, based on previously stored information about recording media and previously stored data obtained by measuring recording media.

Figure 8:
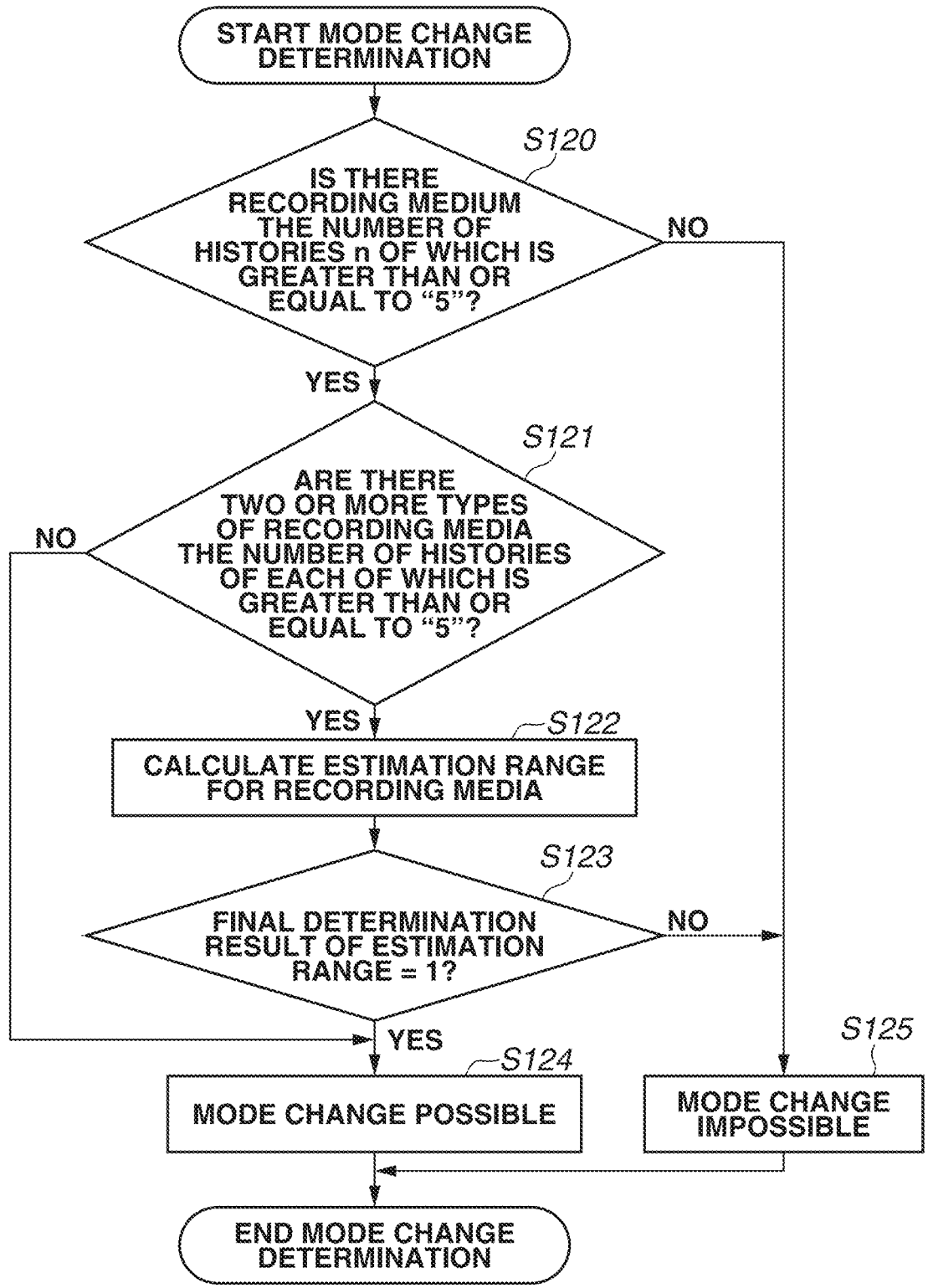
FIG. 8 is a flowchart illustrating mode change determination in the exemplary embodiment.

FIG. 8 is a flowchart illustrating the mode change determination. In step S120, the CPU 401 refers to the stored past data and determines whether there is a recording medium the number of histories (the number of pieces of past measured data) of which is greater than or equal to "5". If it is determined that there is no such recording medium (NO in step S120), the CPU 401 determines that it is impossible to change the current mode to the estimation automatic mode and thus advances the processing to step S125. If it is determined that there is a recording medium the number of histories of which is greater than or equal to "5" (YES in step S120), since there is a possibility of changing to the estimation automatic mode, the CPU 401 advances the processing to step S121. Furthermore, in the present exemplary embodiment, the number of histories is set to "5" as a criterion for determination. This is set as the number of times required for estimating the stability of a type of recording medium determined based on measured data about previously measured recording media and determined by the user. This number can be changed, for example, decreased if the stability is high and increased if the stability is low, depending on a configuration for measuring characteristics of a recording medium or types of recording media supposed to be used.

Next, in step S121, the CPU 401 determines whether there are two or more types of recording media the number of histories of each of which is greater than or equal to "5". If it is determined that there are two or more types of recording media (YES in step S121), the CPU 401 advances the processing to step S122. In the case of measured data illustrated in FIGS. 23A and 23B, the number of histories of each of standard glossy paper and standard plain paper is greater than or equal to "5", so that the CPU 401 advances the processing to step S122. On the other hand, if it is determined that there is only one type of recording medium (NO in step S121), since the number of types of recording media which the user used until now is "1", the CPU 401 determines that, even from this time, there is a possibility of using a fixed type of recording medium and that it is possible to change the mode to a mode for automatically selecting a type of recording medium, and then advances the processing to step S124. Furthermore, while changing of the mode is determined in step S117 illustrated in FIG. 7 described below, in a case where the number of histories is greater than or equal to "5" and the number of types of recording media is "1", since it is supposed that the user is continuing to use a single type of paper, not changing to the "estimation automatic mode" but changing to the "fixed mode" can be performed.

In a case where there are two or more types of recording media the number of histories of each of which is greater than or equal to "5", then in step S122, the CPU 401 calculates an estimation range for recording media from the past measured values. The estimation range is a range of values which each characteristic is estimated to take based on the past measured values. Thus, the estimation range is a range within which, in determining a type of recording medium when the same type of recording medium is fed the next and subsequent times, each characteristic value is estimated to fall. In the case of a recording medium the number of histories of which is "1", "(the value of a history of each characteristic±the learning range)/2" is set as an estimation range with respect to each characteristic, and, in the case of a recording medium the number of histories of which is "2", "(the average value of all of the pieces of history data of each characteristic) ±3τ)/2" is set as an estimation range. The CPU 401 does not perform processing on a portion where there are no histories. FIGS. 23A and 23B illustrate the maximum value and the minimum value of the calculated estimation range about each characteristic.

Next, in step S123, the CPU 401 compares estimation ranges for each characteristic of recording media the number of histories of each of which is at least "1". FIG. 24 illustrates determination results about estimation ranges for respective characteristics, in which "0" is assigned in a case where there is a region overlapping between recording media and "1" is assigned in a case where there is no region overlapping between recording media. For example, in the specular reflection characteristic, since "standard glossy paper" takes a range of 93.6 to 101.4 and "standard plain paper" takes a range of 85.1 to 94.9, so that a range of 93.6 to 94.9 is a region in which there is a possibility of overlapping, the CPU 401 determines that the determination result is "0". On the other hand, since "premium glossy paper" takes a range of 99.0 to 103.6, so that there is no possibility of overlapping with "standard plain paper", the CPU 401 determines that the determination result is "1". Similarly, the CPU 401 performs determination with respect to all of the characteristics. After completing determination with respect to all of the characteristics, the CPU 401 takes "OR" of all of the characteristics with respect to each item of the results. For example, in an item for "standard plain paper" and "standard glossy paper", since the determination results are specular reflection "0", diffuse reflection "1", and paper thickness "1", the CPU 401 takes "OR" of all of the determination results and thus determines that the "OR" result is "1". Similarly, the CPU 401 performs determination on results of all of the recording media.

Thus, in a case where there is no overlapping between recording media in any characteristic, an item of "OR" about all of the determination results becomes "1". FIG. 25 illustrates "OR" results about all of the determination results. In FIG. 25, since all of the items have become "1", recording media have respective different characteristic values in any of the characteristics, so that there being the possibility of recording medium determination in the estimation automatic mode is indicated.

After completing determination about all of the items, the CPU 401 takes "AND" of all of the determination results in each of which there is data, and sets the AND result as a final determination result. In the present exemplary embodiment, since, in FIG. 25, all of the items in each of which there is a result are "1", the final determination result becomes "1". This indicates that, with regard to all of the recording media in each of which there is a history, all of the recording media used in the past do not have a region overlapping with those of all recording media other than the applicable type of recording medium in any characteristic, so that the CPU 401 determines that it is possible to estimate a type of recording medium sufficiently with a high degree of accuracy even when changing to the estimation automatic mode is performed.

If, in step S123, it is determined that the final determination result is "1" (YES in step S123), then in step S124, the CPU 401 sets "mode change possible" as the result of mode change determination, and, if it is determined that the final determination result is "0" (NO in step S123), then in step S125, the CPU 401 sets "mode change impossible" as the result of mode change determination.

After completing the mode change determination, then in step S114 illustrated in FIG. 7, the CPU 401 determines whether mode change is possible. If it is determined that mode change is impossible (NO in step S114), then in step S118, the CPU 401 determines the mode read out in step S110 and selected by the user until now as a mode for use in determining a type of recording medium. Then, the CPU 401 advances the processing to a step for the determined mode (any one of steps S103 to S107).

On the other hand, if, in step S114, it is determined that mode change is possible (YES in step S114), then in step S115, the CPU 401 issues a notification for prompting the user to perform mode change, such as that illustrated in FIG. 26A. If, in step S116, it is determined that the user has selected "perform mode change" (YES in step S116), then in step S117, the CPU 401 changes the mode for use in determining a type of recording medium to the "estimation automatic mode". Moreover, as mentioned above, in a case where the number of types of recording media which were used in all of the histories is "1" in step S121 illustrated in FIG. 8, the CPU 401 can issue a notification for prompting the user to perform switching to the "fixed mode", such as that illustrated in FIG. 26B. If, in step S116, it is determined that the user has selected "do not perform mode change" (NO in step S116), then in step S118, the CPU 401 determines the mode previously set by the user as a mode for use in determining a type of recording medium. At this time, the CPU 401 can notify the user by which mode to perform processing for determining a type of recording medium.

Moreover, while, in step S115, the CPU 401 gives a suggestion to the user for changing of modes, the CPU 401 can be configured to automatically change modes without prompting the user to change modes. Even in that case, the CPU 401 can be configured to notify the user that the mode has been changed.

When the mode for use in determining a type of recording medium has been determined, then in step S119, the CPU 401 stores the determined mode setting information in the EEPROM 404.

When completing the mode determination processing in step S102 in the above-described way, the CPU 401 performs processing corresponding to the mode which has been set. The CPU 401 advances the processing to step S103 in the case of the estimation manual mode, to step S104 in the case of the estimation automatic mode, to step S105 in the case of the manual mode, to step S106 in the fixed mode, or to step S107 in the case of the barcode mode. In each of steps S103 to S107, the CPU 401 determines a type of recording medium, and then ends the recording medium determination processing.

Furthermore, in the present exemplary embodiment, the CPU 401 calculates the estimation range in step S112 based on all of the pieces of measured data obtained and stored in the past, but can be configured to calculate the estimation range, for example, using data obtained by excluding the maximum value and the minimum value from the past measured data. This is because, while types of recording media about which past measured data is stored are determined based on information selected by the user, since it may be supposed that the user selects a type of recording medium by mistake, the CPU 401 excludes the deviating values in consideration of such mistake.

Moreover, the CPU 401 can be configured to include, in addition to the above-mentioned modes, a mode which does not include a step for allowing the user to make a selection and which automatically determines a highest-order type of recording medium from among the extracted candidates. In that case, the CPU 401 can be configured to set not the estimation automatic mode but the above-mentioned mode as a mode to be changed to the automatic determination mode.

As described above, when determining that it is possible to automatically determine a type of recording medium, the CPU 401 prompts the user to allow a type of recording medium to be automatically selected without a step for causing the user to make a selection. In a case where the user has selected allowing a type of recording medium to be automatically selected, an operation to be performed by the user in selecting a type of recording medium can be reduced, so that a convenience for the user can be improved. Other Embodiments Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiment, a convenience for the user in determining a type of recording medium can be improved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-124526 filed Jul. 21, 2020, which is hereby incorporated by reference herein in its entirety.

What is claimed is:

1. An information processing apparatus comprising:
an acquisition unit configured to acquire a measurement result obtained by a measurement unit measuring a characteristic of a recording medium for use in a recording apparatus;
a type reception unit configured to receive information input by a user indicating a type of recording medium selected by the user for use in the recording apparatus;
a notification control unit configured to cause a notification unit to notify the user of information by issuing a notification;
a mode reception unit configured to receive a mode selected from among a plurality of modes for determining a determined type of recording medium for use in the recording apparatus, wherein the information processing apparatus is configured to perform operations including determining, in a designation mode, the selected type of recording medium indicated by the information received by the type reception unit, and determining, in an automatic determination mode, an automatically determined type of recording medium for use in the recording apparatus without receiving the input user information indicating the recording medium type;
a storage unit configured to store the measurement result previously obtained by the measurement unit performing measurement and to store the determined type of recording medium while associating the measurement result and the determined type of recording medium with each other; and
a determination unit configured to determine, based on the measurement result stored in the storage unit, whether the mode for determining the determined type of recording medium is able to be changed from the designation mode to the automatic determination mode,
wherein, in response to the determination unit determining that the mode is able to be changed from the designation mode to the automatic determination mode, the notification control unit causes the notification unit to issue a prompting notification to prompt the user to change the mode.

2. The information processing apparatus according to claim 1,
wherein the notification control unit is configured to cause the notification unit to issue an indication notification indicating the type of recording medium,
wherein the designation mode includes a first designation mode, and
wherein the first designation mode is a mode in which the acquisition unit acquires the measurement result and the notification control unit is configured to (i) extract a candidate for a measured type of recording medium based on the measurement result and previously stored characteristic values of recording media serving as criteria, (ii) cause the notification unit to issue a candidate notification indicating the candidate for the measured type of recording medium, and (iii) determine the selected type of recording medium as the type of recording medium for use in the recording apparatus.

3. The information processing apparatus according to claim 2, wherein the notification control unit is configured to set a type of recording medium the measurement result of which falls within a first range extending from a middle value of a characteristic value of a recording medium serving as a criterion corresponding to the type of recording medium as a candidate type of recording medium serving as the candidate for the measured type of recording medium, and to cause the notification unit to issue a notification of information indicating the type of recording medium serving as the candidate for the measured type of recording medium.

4. The information processing apparatus according to claim 3, wherein the notification control unit is configured to cause the notification unit to issue a candidate notification of information indicating the type of recording medium serving as the candidate in order of the measurement result being closer to the middle value of the characteristic value of the recording medium serving as the criterion.

5. The information processing apparatus according to claim 1,
wherein the notification control unit is configured to cause the notification unit to issue an indication notification indicating the type of recording medium,
wherein the designation mode includes a second designation mode, and
wherein the second designation mode is a mode in which the notification control unit is configured to (i) cause the notification unit to issue a notification indicating a type of recording medium which is able to be selected for use in the recording apparatus, and (ii) determine the selected type of recording medium indicated by the information received by the type reception unit for use in the recording apparatus.

6. The information processing apparatus according to claim 1,
wherein the notification control unit is configured to cause the notification unit to issue an indication notification indicating the type of recording medium,
wherein the automatic determination mode includes a first automatic determination mode, and
wherein the first automatic determination mode is a mode in which the acquisition unit is configured to acquire the measurement result and the notification control unit is configured to (i) cause the notification unit to issue an extracted notification indicating a plurality of types of recording media extracted based on the measurement result and previously stored characteristic values of recording media serving as criteria, (ii) determine a type of recording medium indicated as highest in priority for use in the recording apparatus in a case where an operation on the notification unit is not performed within a predetermined time from the extracted notification, and (iii) determine the selected type of recording medium indicated by the information received by the type reception unit for use in the recording apparatus in a case where an operation on the notification unit is performed within the predetermined time from the extracted notification.

7. The information processing apparatus according to claim 1,
wherein the automatic determination mode includes a second automatic determination mode, and
wherein the second automatic determination mode is a mode which previously sets a set type of recording medium for use in the recording apparatus and determines the previously set type of recording medium for use in the recording apparatus.

8. The information processing apparatus according to claim 1, wherein the automatic determination mode includes a third automatic determination mode, and wherein the third automatic determination mode is a mode which determines a type of recording medium determined based on the measurement result and previously stored characteristic values serving as criteria for use in the recording apparatus.

9. The information processing apparatus according to claim 1, wherein the information processing apparatus is configured to perform further operations including executing a mode different from the designation mode and the automatic determination mode, and wherein the different mode is a mode which (i) causes the recording apparatus to record information on the recording medium for identifying a type of recording medium as information used for the user to determine a type of recording medium, (ii) acquires the type of recording medium by the measurement unit reading the information for identifying a type of recording medium, and (iii) determines the acquired type of recording medium for use in the recording apparatus.

10. The information processing apparatus according to claim 1, wherein the storage unit is configured to store a plurality of measurement results, each corresponding to the measurement result, previously obtained by the measurement unit performing measurement with respect to respective types of recording media, and wherein the determination unit determines, based on a number of the measurement results previously obtained by the measurement unit and stored in the storage unit, whether a mode for determining a type of recording medium for use in the recording apparatus is able to be changed to the automatic determination mode.

11. The information processing apparatus according to claim 10, wherein, in a case where the number of the measurement results previously obtained by the measurement unit and stored in the storage unit while being associated with respective types of recording media is greater than a predetermined number with respect to only one type of recording medium, the determination unit determines that a mode for determining a type of recording medium for use in the recording apparatus is able to be changed to the automatic determination mode.

12. The information processing apparatus according to claim 11, wherein the automatic determination mode includes a second automatic determination mode, wherein the second automatic determination mode is a mode which previously sets a type of recording medium for use in the recording apparatus and determines the previously set type of recording medium for use in the recording apparatus, and wherein the notification control unit causes the notification unit to issue a notification prompting the user to perform changing to the second automatic determination mode.

13. The information processing apparatus according to claim 1, further comprising an estimation unit configured to estimate a characteristic value of a recording medium, which is estimated for each type of recording medium, based on the measurement result previously obtained by the measurement unit and stored in the storage unit, wherein the determination unit determines, based on the characteristic value estimated by the estimation unit for each type of recording medium, whether a mode for determining a type of recording medium for use in the recording apparatus is able to be changed to the automatic determination mode.

14. The information processing apparatus according to claim 13, wherein, in a case where a number of measurement results, each corresponding to the measurement result, previously obtained by the measurement unit and stored in the storage unit while being associated with respective types of recording media is greater than a predetermined number with respect to a plurality of types of recording media, the determination unit determines, based on the characteristic value estimated by the estimation unit for each type of recording medium, whether a mode for determining a type of recording medium for use in the recording apparatus is able to be changed to the automatic determination mode.

15. The information processing apparatus according to claim 14, wherein the characteristic value is a value including a maximum value and a minimum value, and wherein the determination unit determines that a mode for determining a type of recording medium for use in the recording apparatus is able to be changed to the automatic determination mode in a case where ranges each of which is formed by the maximum value and the minimum value of the characteristic value estimated by the estimation unit for each type of recording medium do not overlap each other.

16. The information processing apparatus according to claim 15, wherein the acquisition unit acquires a first characteristic value indicating a first characteristic of a recording medium and a second characteristic value indicating a second characteristic of the recording medium, wherein the estimation unit estimates a maximum value and a minimum value of the acquired first characteristic value and a maximum value and a minimum value of the acquired second characteristic value with respect to each type of recording medium, and wherein the determination unit determines that a mode for determining a type of recording medium for use in the recording apparatus is able to be changed to the automatic determination mode in a case where one of a set of ranges each of which is formed by the maximum value and the minimum value of the acquired first characteristic value and a set of ranges each of which is formed by the maximum value and the minimum value of the acquired second characteristic value does not overlap in ranges with respect to any type of recording medium.

17. The information processing apparatus according to claim 13, wherein the notification control unit is configured to cause the notification unit to issue a notification indicating a type of recording medium, wherein the automatic determination mode includes a first automatic determination mode, wherein the first automatic determination mode is a mode in which the acquisition unit (i) acquires the measurement result and the notification control unit causes the notification unit to issue a notification indicating a plurality of types of recording media extracted based on the measurement result and previously stored characteristic values of recording media serving as criteria, (ii) determines a type of recording medium indicated as highest in priority for use in the recording apparatus in a case where an operation on the notification unit is not performed within a predetermined time from the notification, and (iii) determines the selected type of recording medium indicated by the information received by the type reception unit for use in the recording apparatus in a case where an operation on the notification unit is performed within the predetermined time from the notification, and wherein the notification control unit causes the notification unit to issue a notification prompting the user to perform changing to the first automatic determination mode.

18. The information processing apparatus according to claim 1, further comprising a changing unit configured to change, based on the measurement value, a previously stored characteristic value of a recording medium serving as a criterion corresponding to a type of recording medium determined for use in the recording apparatus, which is used in determining a type of recording medium for use in the recording apparatus.

19. The information processing apparatus according to claim 18, wherein the changing unit performs correction in such a manner that the characteristic value of a recording medium serving as a criterion corresponding to a type of recording medium determined for use in the recording apparatus comes close to the measurement value.

20. The information processing apparatus according to claim 1, further comprising:
a recording unit configured to apply a recording agent to the recording medium; and
a conveyance unit configured to convey a recording medium to a position where recording is performed,
wherein the conveyance unit conveys the recording medium to a position where the recording unit is configured to perform recording, and the recording unit performs recording on the conveyed recording medium.

21. The information processing apparatus according to claim 20,
wherein the recording apparatus includes a movable carriage having the recording unit mounted thereon, and
wherein the measurement unit is mounted on the carriage and measures the characteristic of the recording medium conveyed by the conveyance unit to a position where the measurement unit is configured to perform measurement.

22. An information processing apparatus comprising:
an acquisition unit configured to acquire a measurement result obtained by a measurement unit measuring a characteristic of a recording medium for use in a recording apparatus;
a type reception unit configured to receive information input by a user indicating a type of recording medium selected by the user for use in the recording apparatus;
a mode reception unit configured to receive a mode selected from among a plurality of modes for determining a determined type of recording medium for use in the recording apparatus, wherein the information processing apparatus is configured to perform operations including determining, in a designation mode, the selected type of recording medium indicated by the information received by the type reception unit, and determining, in an automatic determination mode, an automatically determined type of recording medium for use in the recording apparatus without the user designating the recording medium type;
a storage unit configured to store the measurement result previously obtained by the measurement unit performing measurement and to store the determined type of recording medium while associating the measurement result and the determined type of recording medium with each other; and
a changing unit configured to change, based on the measurement result stored in the storage unit, the mode for determining the determined type of recording medium from the designation mode to the automatic determination mode.

23. An information processing method for an information processing apparatus, the information processing method comprising:
acquiring a measurement result obtained by measuring a characteristic of a recording medium for use in a recording apparatus;
receiving information input by a user indicating a type of recording medium selected by the user for use in the recording apparatus;
causing notification of the user of information by issuing a notification;
receiving a mode selected from among a plurality of modes for determining a determined type of recording medium for use in the recording apparatus, wherein the information processing apparatus perform operations including determining, in a designation mode, the selected type of recording medium indicated by the received information, and determining, in an automatic determination mode, an automatically determined type of recording medium for use in the recording apparatus without receiving the input user information indicating the recording medium type;
storing the measurement result previously obtained by performing measurement and to store the determined type of recording medium while associating the measurement result and the determined type of recording medium with each other; and
determining, based on the stored measurement result, whether the mode for determining the determined type of recording medium is able to be changed from the designation mode to the automatic determination mode,
wherein, in response to determining that the mode is able to be changed from the designation mode to the automatic determination mode, causing includes causing issuance of a prompting notification to prompt the user to change the mode.

24. A non-transitory computer-readable storage medium storing a program to cause a computer to perform an information processing method for an information processing apparatus, the information processing method comprising:
acquiring a measurement result obtained by measuring a characteristic of a recording medium for use in a recording apparatus;
receiving information input by a user indicating a type of recording medium selected by the user for use in the recording apparatus;
causing notification of the user of information by issuing a notification;
receiving a mode selected from among a plurality of modes for determining a determined type of recording medium for use in the recording apparatus, wherein the information processing apparatus perform operations including determining, in a designation mode, the selected type of recording medium indicated by the received information, and
determining, in an automatic determination mode, an automatically determined type of recording medium for use in the recording apparatus without receiving the input user information indicating the recording medium type;

storing the measurement result previously obtained by performing measurement and to store the determined type of recording medium while associating the measurement result and the determined type of recording medium with each other; and determining, based on the stored measurement result, whether the mode for determining the determined type of recording medium is able to be changed from the designation mode to the automatic determination mode, wherein, in response to determining that the mode is able to be changed from the designation mode to the automatic determination mode, causing includes causing issuance of a prompting notification to prompt the user to change the mode.

* * * * *